(12) United States Patent
Iwatsuka et al.

(10) Patent No.: US 10,989,980 B2
(45) Date of Patent: Apr. 27, 2021

(54) OPTICAL MODULATOR

(71) Applicants: TDK Corporation, Tokyo (JP);
FUJITSU OPTICAL COMPONENTS LIMITED, Kanagawa (JP)

(72) Inventors: Shinji Iwatsuka, Tokyo (JP); Kenji Endou, Tokyo (JP); Hiroki Hara, Tokyo (JP); Toshinori Matsuura, Tokyo (JP); Takashi Kikukawa, Tokyo (JP); Yasuhiro Ohmori, Kanagawa (JP); Masaharu Doi, Kanagawa (JP); Shintaro Takeuchi, Kanagawa (JP); Takehito Tanaka, Kanagawa (JP); Yoshinobu Kubota, Kanagawa (JP)

(73) Assignees: TDK CORPORATION, Tokyo (JP); FUJITSU OPTICAL COMPONENTS LIMITED, Kanagawa (JP)

( * ) Notice: Subject to any disclaimer, the term of this patent is extended or adjusted under 35 U.S.C. 154(b) by 0 days.

(21) Appl. No.: 16/799,753

(22) Filed: Feb. 24, 2020

(65) Prior Publication Data
US 2020/0271963 A1 Aug. 27, 2020

(30) Foreign Application Priority Data
Feb. 25, 2019 (JP) .............................. JP2019-031795

(51) Int. Cl.
*G02F 1/225* (2006.01)
*G02F 1/03* (2006.01)
*G02F 1/21* (2006.01)

(52) U.S. Cl.
CPC .......... *G02F 1/2255* (2013.01); *G02F 1/0316* (2013.01); *G02F 2001/212* (2013.01); *G02F 2201/063* (2013.01); *G02F 2201/07* (2013.01); *G02F 2201/127* (2013.01); *G02F 2202/20* (2013.01)

(58) Field of Classification Search
None
See application file for complete search history.

(56) References Cited

U.S. PATENT DOCUMENTS

| 10,684,530 B1* | 6/2020 | Bian .......................... G02F 1/29 |
| 2005/0175271 A1 | 8/2005 | Sugiyama et al. |

(Continued)

FOREIGN PATENT DOCUMENTS

| JP | H05-158003 A | 6/1993 |
| JP | H05-173099 A | 7/1993 |

(Continued)

*Primary Examiner* — Jerry Rahll
(74) *Attorney, Agent, or Firm* — McDermott Will & Emery LLP

(57) ABSTRACT

An optical modulator is provided with a substrate, first and second optical waveguides each formed of a ridge-shaped electro-optic material film and disposed so as to be mutually adjacent on the substrate, a buffer layer covering upper surfaces of the first and second optical waveguides, first and second signal electrodes provided above the buffer layer so as to be opposed respectively to the first and second optical waveguides, and a dielectric layer covering at least one of a part of an exposed surface of the first signal electrode and a part of an exposed surface of the second signal electrode, and a part of an upper surface of the buffer layer. Differential signals are applied to the first and second signal electrodes.

9 Claims, 21 Drawing Sheets

100

(56) References Cited

U.S. PATENT DOCUMENTS

| | | |
|---|---|---|
| 2015/0138619 A1 | 5/2015 | Iwatsuka et al. |
| 2019/0146302 A1 | 5/2019 | Iwatsuka et al. |
| 2019/0271897 A1 | 9/2019 | Iwatsuka et al. |

FOREIGN PATENT DOCUMENTS

| | | |
|---|---|---|
| JP | H06-235891 A | 8/1994 |
| JP | 2006-195383 A | 7/2006 |
| JP | 4485218 B2 | 6/2010 |
| JP | 2014-006348 A | 1/2014 |
| JP | 2014-142411 A | 8/2014 |
| JP | 2015-118371 A | 6/2015 |
| JP | 2017-129834 A | 7/2017 |
| JP | WO2017/183484 A1 | 2/2019 |

* cited by examiner

OPTICAL MODULATOR

BACKGROUND OF THE INVENTION

Field of the Invention

The present invention relates to an optical modulator used in the fields of optical communication and optical measurement and, more particularly, to an electrode structure of a Mach-Zehnder optical modulator.

Description of Related Art

Communication traffic has been remarkably increased with widespread Internet use, and optical fiber communication is increasingly significant. The optical fiber communication is a technology that converts an electric signal into an optical signal and transmits the optical signal through an optical fiber and has a wide bandwidth, a low loss, and high resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As the optical modulator, a Mach-Zehnder optical modulator in which an optical waveguide is formed by Ti (titanium) diffusion in the vicinity of the surface of a lithium niobate single-crystal substrate has been put to practical use (see, e.g., Japanese Patent No. 4,485,218). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as large as about 10 cm, which is disadvantageously long.

On the other hand, JP 2006-195383A and JP 2014-006348A disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

The cross-sectional structure of a conventional optical modulator 1200 described in JP 2006-195383A is illustrated in FIG. 21A. A pair of optical waveguides 22a and 22b of a lithium niobate film are formed on a sapphire substrate 21, and a signal electrode 24a and a ground electrode 24b are disposed above the optical waveguides 22a and 22b, respectively, through a buffer layer 23. The optical modulator 1200 is of a so-called single drive type having one signal electrode 24a, and the signal electrode 24a and ground electrode 24b have a symmetrical structure, so that electric fields to be applied to the optical waveguides 22a and 22b are the same in magnitude and opposite in polarity, preventing the wavelength chirp of a modulated light from occurring. However, the area of the ground electrode 24b is small, preventing operation at high frequencies.

The cross-sectional structure of a conventional optical modulator 1300 described in JP 2014-006348A is illustrated in FIG. 21B. Two signal electrodes $24a_1$ and $24a_2$ are disposed above a pair of optical waveguides 22a and 22b of a lithium niobate film, respectively, through a buffer layer 23, and three ground electrodes 24c, 24d and 24e are disposed so as to be separated from the signal electrodes $24a_1$ and $24a_2$. When voltages same in magnitude and opposite in polarity are applied to the two signal electrodes $24a_1$ and $24a_2$, respectively, electric fields to be applied to the optical waveguides 22a and 22b become the same in magnitude and opposite in polarity, preventing the wavelength chirp of a modulated light from occurring. Further, the amount of the chirp can be controlled by adjusting the voltage to be applied to the pair of optical waveguides 22a and 22b. Furthermore, a sufficient area is ensured for the left and right ground electrodes 24c and 24d, allowing operation at high frequencies. However, the optical modulator 1300, which is of a dual drive type having two signal electrodes $24a_1$ and $24a_2$, takes a complex electrode structure.

In optical modulators, a wider bandwidth of equal to or more than 35 GHz is required for higher transmission speed from 32 Gbaud currently used to 64 Gbaud. In order to achieve such a wider bandwidth, the following three points are important: (1) Reduction in electrode loss at high frequencies; (2) Velocity matching between light and microwave; and (3) Impedance matching. Among them, (1) is particularly important. This is because, at high frequencies, current only flows in the vicinity of the electrode surface due to the skin effect to result in an increase in electrode loss.

In order to reduce an electrode loss in the conventional optical modulator illustrated in FIG. 21B, it is effective to increase the cross-sectional area of the signal electrode. To this end, it is necessary to increase the thicknesses T or widths W of the signal electrodes $24a_1$ and $24a_2$.

However, increasing the thicknesses T of the signal electrodes $24a_1$ and $24a_2$ may reduce the effective dielectric constant of microwave to prevent velocity matching and may lower impedance to prevent impedance matching. Further, increasing the widths W of the signal electrodes $24a_1$ and $24a_2$ may deteriorate efficiency of the electric field to be applied to the optical waveguide although the effective dielectric constant and impedance of microwave do not change significantly to result in an increase in half-wavelength voltage. Therefore, in a conventional electrode structure, it is difficult to achieve a wider bandwidth of equal to or more than 35 GHz supporting high-speed transmission of 64 Gbaud.

Further, the effective dielectric constant of microwave depends on the dielectric constant of the buffer layer, so that it is difficult to match the velocity of microwave to the velocity of light by bringing the effective refractive index of microwave close to the effective refractive index of light.

SUMMARY

An object of the present invention is therefore to provide a dual drive type optical modulator capable of improving velocity matching between signal wave and light, having a low electrode loss, having satisfactory high-frequency characteristics, and capable of being driven with a low voltage due to improvement in efficiency of an electric field to be applied to an optical waveguide.

To solve the above problems, an optical modulator according to the present invention includes: a substrate; first and second optical waveguides each formed of a ridge-shaped electro-optic material film and disposed so as to be mutually adjacent on the substrate; a buffer layer covering upper surfaces of the first and second optical waveguides; first and second signal electrodes provided above the buffer layer so as to be opposed respectively to the first and second optical waveguides; and a dielectric layer covering at least one of a part of an exposed surface of the first signal electrode and a part of an exposed surface of the second signal electrode, and a part of an upper surface of the buffer layer, wherein differential signals are applied to the first and second signal electrodes.

According to the present invention, the dielectric layer is provided around the first and second signal electrodes, so that the effective refractive index of a high-frequency signal can be increased to coincide with the effective refractive index of light to achieve a wider bandwidth.

In the present invention, it is preferable that the first signal electrode includes a first lower layer part opposed to the first optical waveguide through the buffer layer and a first upper layer part provided above the first lower layer part and that the second signal electrode includes a second lower layer part opposed to the second optical waveguide through the buffer layer and a second upper layer part provided above the second lower layer part. Further, it is preferable that a width of the lower surface of each of the first and second lower layer parts is smaller than a width of each of the first and second upper layer parts. Furthermore, it is preferable that a width of the first upper layer part extends from the first lower layer part to the side opposite to the second signal electrode and that a width of the second upper layer part extends from the second lower layer part to the side opposite to the first signal electrode.

By thus reducing the width of the lower surface of the lower layer part of each of the first and second signal electrodes opposite to each of the first and second optical waveguides, an electric field can be concentrated on the first and second optical waveguides. Further, by increasing the width of the upper layer part of the signal electrode to increase the cross-sectional area of the electrode, skin effect can be reduced to suppress an electrode loss. Thus, there can be provided a differential optical modulator having satisfactory high-frequency characteristics and capable of being driven with a low voltage.

It is preferable that a gap between the first and second upper layer parts is equal to or larger than a gap between the first and second lower layer parts. When a gap between the upper layer parts is made smaller than a gap between the lower layer parts in order to increase the width of each of the first and second signal electrodes, an electrode loss at high frequencies is increased to lower impedance. However, when a substantially L-shaped electrode extending outside so as not to make the upper layer parts approach each other is adopted, an electrode loss can be reduced.

It is preferable that the optical modulator according to the present invention further includes an insulating layer formed above the buffer layer and an electrode layer formed on the insulating layer and including the first and second upper layer parts and that the first and second lower layer parts are each embedded in openings formed in the insulating layer. With this configuration, it is possible to easily form a signal electrode having a two-layer structure.

In the present invention, it is preferable that the first and second optical waveguides are symmetric in cross section, and that the first and second signal electrodes are symmetric in cross section. With this configuration, it is possible to realize a dual drive type optical modulator having reduced wavelength chirp.

In the present invention, it is preferable that the width of the lower surface of each of the first and second lower layer parts is larger than the width of each of the first and second optical waveguides. With this configuration, an electric field can be evenly applied to the entire optical waveguide in the width direction thereof, whereby it is possible to realize an optical modulator having satisfactory high-frequency characteristics and capable of being driven with a low voltage.

In the present invention, at least part of the insulating layer existing at the lower portion of an electrode isolation area between the first and second signal electrodes may be removed. In this case, the dielectric layer is preferably embedded in a concave portion formed by removal of the insulating layer and formed on the upper surface of the buffer layer. With this configuration, it is possible to adjust the effective refractive index of signal wave to thereby improve velocity matching between signal wave and light.

In the present invention, it is preferable that the dielectric layer is formed on upper and side surfaces of each of the first and second signal electrodes and an upper surface of the insulating layer in an area not overlapping the first and second signal electrodes in a plan view. By thus covering the upper and side surfaces of each of the first and second signal electrodes, the effective refractive index of signal wave can be brought close to the effective refractive index of light, whereby velocity matching between signal wave and light can be improved.

In the present invention, it is preferable that the dielectric layer is formed on the upper surface of the buffer layer and that the insulating layer is formed on an upper surface of the dielectric layer. Thus, even when the dielectric layer is disposed between the buffer layer and the insulating layer, the effective refractive index of signal wave can be brought close to the effective refractive index of light.

In the present invention, it is preferable that no ground electrode is provided in an area in the vicinity of the first signal electrode on a side opposite to the second signal electrode with respect to the first signal electrode and in an area in the vicinity of the second signal electrode on a side opposite to the first signal electrode with respect to the second signal electrode. When a ground electrode having a sufficient width or area cannot be provided in the vicinity of the signal electrode due to miniaturization or high integration of optical modulation device, ripple or crosstalk appearing in EO characteristics becomes a problem. However, when the ground electrode is removed from the vicinity of the signal electrode, ripple or crosstalk appearing in EO characteristics can be reduced.

The optical modulator according to the present invention may further include a first ground electrode disposed in an area in the vicinity of the first signal electrode on a side opposite to the second signal electrode with respect to the first signal electrode and a second ground electrode disposed in an area in the vicinity of the second signal electrode on a side opposite to the first signal electrode with respect to the second signal electrode. With this configuration, there can be provided an optical modulator having satisfactory high-frequency characteristics and reduced radiation loss and wavelength chirp.

In the present invention, it is preferable that each of the first and second optical waveguides has at least one linear section and at least one curved section, that the first signal electrode is provided along the linear section and the curved section of the first optical waveguide, and that the second signal electrode is provided along the linear section and the curved section of the second optical waveguide. With this configuration, the optical waveguide can be configured in a folded form to reduce the element length. Further, when the signal electrode is provided along the curved section, ripple or crosstalk appearing in EO characteristics becomes a major problem; however, when the dielectric layer is provided as in the present invention, EO characteristics can be improved.

In the present invention, it is preferable that the substrate is a single crystal substrate, that the electro-optic material film is a lithium niobate film, and that the c-axis of the lithium niobate film is oriented perpendicular to the main surface of the substrate. When a Mach-Zehnder optical waveguide of an optical modulator is formed using the lithium niobate film, the optical waveguide can be made very thin and narrow in line width, whereby a small-sized and high-quality optical modulator can be obtained. However, since the optical waveguide is very thin and narrow in line width, a problem of the electric field concentration is conspicuous. According to the present invention, nonetheless, such a problem can be solved, and thus there can be provided an optical modulator having satisfactory high-frequency characteristics and reduced wavelength chirp and capable of being driven at low voltage. In particular, when an optical waveguide formed of a lithium niobate film is used, it has small loss even when the curvature radius thereof is reduced up to about 50 μm, and the effects of the present invention are significant.

According to the present invention, there can be provided a dual drive type optical modulator capable of improving velocity matching between signal wave and light, having a low electrode loss, having satisfactory high-frequency characteristics, and capable of being driven at low voltage due to improvement in efficiency of an electric field to be applied to an optical waveguide.

BRIEF DESCRIPTION OF THE DRAWINGS

The above and other objects, features and advantages of this invention will become more apparent by reference to the following detailed description of the invention taken in conjunction with the accompanying drawings, wherein:

FIGS. 1A and 1B are schematic plan views illustrating the configuration of an optical modulator according to a first embodiment of the present invention, in which FIG. 1A illustrates only an optical waveguide, and FIG. 1B illustrates the entire configuration of the optical modulator including traveling-wave electrodes;

FIGS. 6A and 6B are schematic plan views illustrating the configuration of an optical modulator according to a fifth embodiment of the present invention, in which FIG. 6A illustrates only the optical waveguide, and FIG. 6B illustrates the entire configuration of the optical modulator including the traveling-wave electrodes;

DETAILED DESCRIPTION OF THE EMBODIMENTS

Figure 1A:
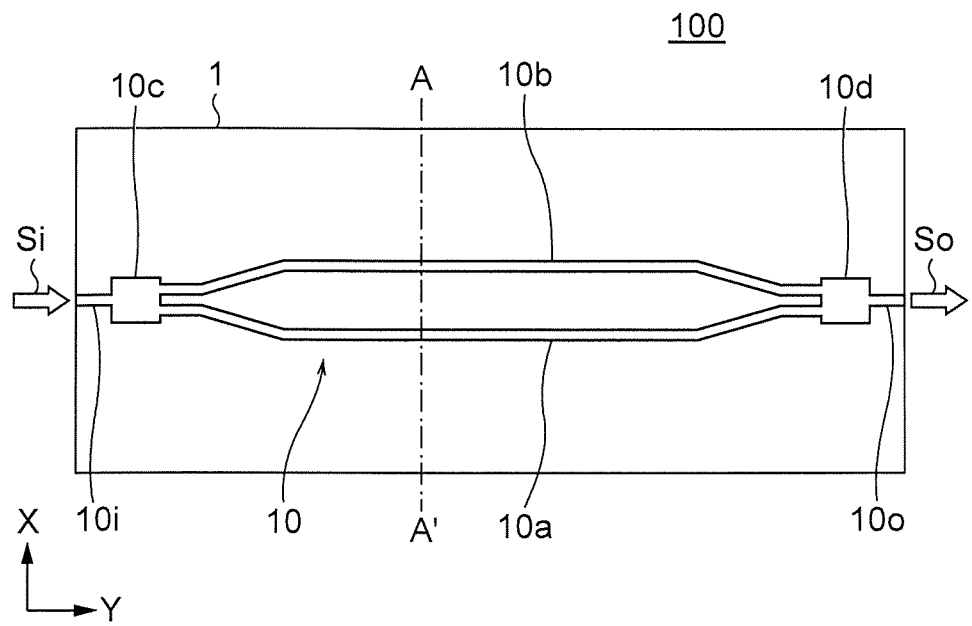
Figure 1B:
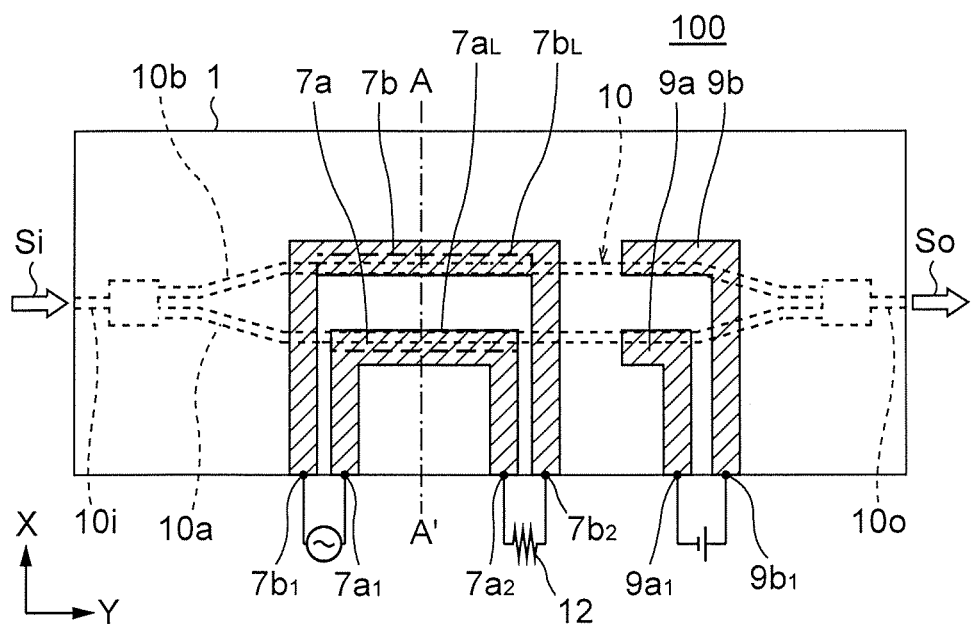

Preferred embodiments of the present invention will now be explained in detail with reference to the drawings. FIGS. 1A and 1B are schematic plan views illustrating the configuration of an optical modulator according to a first embodiment of the present invention. FIG. 1A illustrates only an optical waveguide, and FIG. 1B illustrates the entire configuration of the optical modulator including traveling-wave electrodes.

As illustrated in FIGS. 1A and 1B, an optical modulator 100 includes a Mach-Zehnder optical waveguide 10 formed on a substrate 1 and having first and second optical waveguides 10a and 10b provided in parallel to each other, a first signal electrode 7a provided along the first optical waveguide 10a, a second signal electrode 7b provided along the second optical waveguide 10b, a first bias electrode 9a provided along the first optical waveguide 10a, and a second bias electrode 9b provided along the second optical waveguide 10b. The first and second signal electrodes 7a and 7b constitute an interaction part of a Mach-Zehnder optical modulating element together with the first and second optical waveguides 10a and 10b.

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input waveguide 10i at a demultiplexer 10c, and the first and second optical waveguides 10a and 10b are combined into a single output waveguide 10o at a multiplexer 10d. An input light Si is demultiplexed at the demultiplexer 10c. The demultiplexed lights travel through the first and second optical waveguides 10a and 10b and then multiplexed at the multiplexer 10d. The multiplexed light is output from the output waveguide 10o as a modulated light So.

The first and second signal electrodes 7a and 7b are linear electrodes overlapping the first and second optical waveguides 10a and 10b, respectively, in a plan view. Both ends of each of the first and second signal electrodes 7a and 7b are drawn to the outer peripheral end of the substrate 1. One ends $7a_1$ and $7b_1$ of the first and second signal electrodes 7a and 7b each serve as a signal input terminal, and the other ends $7a_2$ and $7b_2$ thereof are connected to each other through a terminal resistor 12. As a result, the first and second signal electrodes 7a and 7b function as differential coplanar traveling-wave electrodes. Although details will be described later, the first and second signal electrodes 7a and 7b each have a two-layer structure. A lower layer part $7a_L$ of the first signal electrode 7a denoted by the thick dashed line overlaps the first optical waveguide 10a in a plan view, and a lower layer part $7b_L$ of the second signal electrode 7b denoted by the thick dashed line overlaps the second optical waveguide 10b in a plan view.

The first and second bias electrodes 9a and 9b are provided independently of the first and second signal electrodes 7a and 7b, respectively, so as to apply direct-current voltage (DC bias) to the first and second optical waveguides 10a and 10b. One ends $9a_1$ and $9b_1$ of the first and second bias electrodes 9a and 9b are each an input terminal of the DC bias. Although, in the present embodiment, the first and second bias electrodes 9a and 9b are positioned closer to the output terminal side of the Mach-Zehnder optical waveguide 10 than the first and second signal electrodes 7a and 7b are, they may be positioned closer to the input terminal side. Further, the first and second bias electrodes 9a and 9b may be omitted, and instead, a modulated signal including superimposed DC bias may be input to the first and second signal electrodes 7a and 7b.

Differential signals (modulated signals) having the same absolute value but opposite signs are input to the one end $7a_1$ of the first signal electrode 7a and one end $7b_1$ of the second signal electrode 7b. The first and second optical waveguides 10a and 10b are each formed of a material, such as lithium niobate, having an electro-optic effect, so that the refractive indices of the first and second optical waveguides 10a and 10b are changed with +Δn and -Δn by an electric field applied to the first and second optical waveguides 10a and 10b, with the result that a phase difference between the pair of optical waveguides changes. A signal light modulated by the change in the phase difference is output from the output waveguide 10o.

As described above, the optical modulator 100 according to the present embodiment is of a dual drive type constituted by the pair of signal electrodes 7a and 7b, so that it is possible to increase the symmetry of the electric field to be applied to the pair of optical waveguides to thereby reduce the wavelength chirp.

Figure 2:
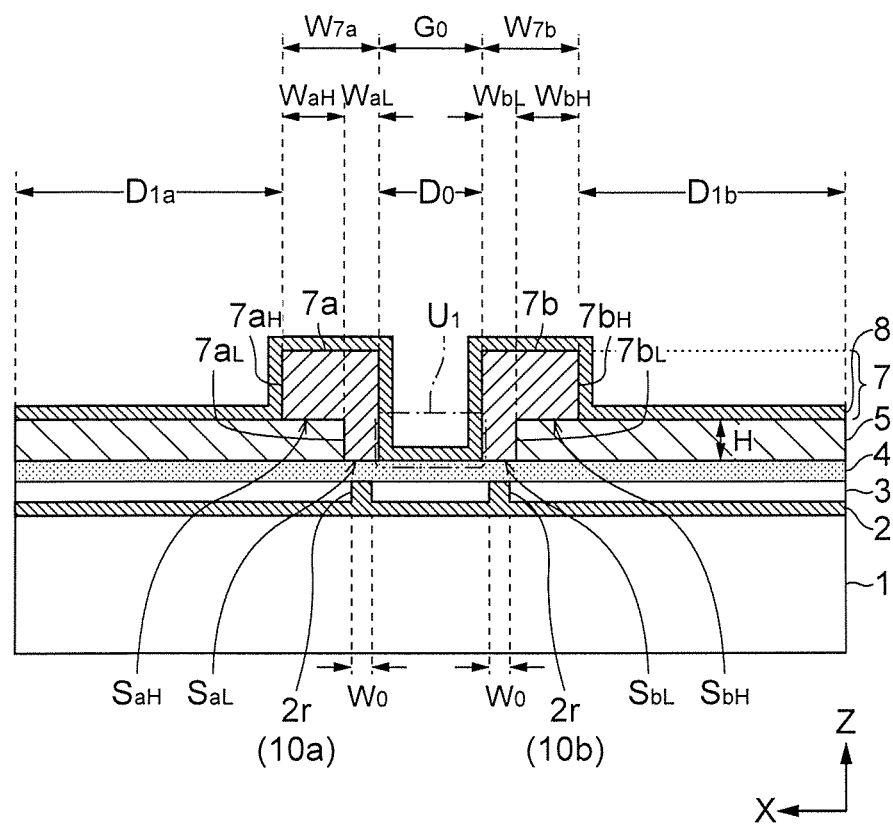
FIG. 2 is a schematic cross-sectional view of the optical modulator taken along line A-A' in FIGS. 1A and 1B.

FIG. 2 is a schematic cross-sectional view of the optical modulator taken along line A-A' in FIGS. 1A and 1B.

As illustrated in FIG. 2, the optical modulator 100 according to the present embodiment has a multilayer structure including a substrate 1, a waveguide layer 2, a protective layer 3, a buffer layer 4, an insulating layer 5, an electrode layer 7 and a dielectric layer 8 which are laminated in this order.

The substrate 1 is, e.g., a sapphire substrate, and the waveguide layer 2 of an electro-optic material, such as a lithium niobate film, is formed on the surface of the substrate 1. The waveguide layer 2 has the first and second optical waveguides 10a and 10b each formed by a ridge part 2r. A ridge width $W_0$ of each of the first and second optical waveguides 10a and 10b can be set to, e.g., 1 μm.

The protective layer 3 is formed in an area not overlapping the first and second optical waveguides 10a and 10b in a plan view. The protective layer 3 covers the entire area of the upper surface of the waveguide layer 2 excluding portions where the ridge parts 2r are formed, and the side surfaces of each of the ridge parts 2r are also covered with the protective layer 3, so that scattering loss caused due to the roughness of the side surfaces of the ridge part 2r can be prevented. The thickness of the protective layer 3 is substantially equal to the height of the ridge part 2r of the waveguide layer 2. There is no particular restriction on the material of the protective layer 3 and, for example, silicon oxide ($SiO_2$) may be used.

The buffer layer 4 is formed on the upper surfaces of the ridge parts 2r of the waveguide layer 2 so as to prevent light propagating through the first and second optical waveguides 10a and 10b from being absorbed by the first and second signal electrodes 7a and 7b. The buffer layer 4 is preferably formed of a material having a lower refractive index than the waveguide layer 2 and a high transparency, such as $Al_2O_3$, $SiO_2$, $LaAlO_3$, $LaYO_3$, ZnO, $HfO_2$, MgO or $Y_2O_3$, and the thickness of the buffer layer 4 on the upper surface of the ridge part 2r may be about 0.2 μm to 1 μm. Although the buffer layer 4 is more preferably formed of a material having a higher dielectric constant than the insulating layer 5, it may be formed of the same material as the insulating layer 5. In the present embodiment, although the buffer layer 4 covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b. Further, the buffer layer 4 may be directly formed on the entire upper surface of the waveguide layer 2 with the protective layer 3 omitted.

The film thickness of the buffer layer 4 is preferably as large as possible in order to reduce light absorption of an electrode and preferably as small as possible in order to apply a high electric field to the first and second optical waveguides 10a and 10b. The light absorption and applied voltage of an electrode have a trade-off relation, so that it is necessary to set adequate film thickness according to the purpose. The dielectric constant of the buffer layer 4 is preferably as high as possible, because the higher the dielectric constant thereof, the more VπL (index representing electric field efficiency) is reduced. Further, the refractive index of the buffer layer 4 is preferably as low as possible, because the lower the refractive index thereof, the thinner the buffer layer 4 can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The insulating layer 5 is provided to form a level difference on the lower surface of the traveling-wave electrodes. The insulating layer 5 is preferably formed of a material having a low dielectric constant, such as $SiO_2$. Openings (slits) are formed in areas of the insulating layer 5 that overlap the respective first and second optical waveguides 10a and 10b to expose the upper surface of the buffer layer 4 therethrough. A part of the conductive material of the electrode layer 7 is embedded in the openings, whereby the level differences are formed on the lower surfaces of the first and second signal electrodes 7a and 7b, respectively. The thickness of the insulating layer 5 is preferably equal to or larger than 1 µm. When the thickness of the insulating layer 5 is equal to or larger than 1 µm, an effect brought about by providing the level difference on the lower surfaces of the respective first and second signal electrodes 7a and 7b can be obtained.

In the present embodiment, at least a part (part surrounded by dashed line $U_1$) of the insulating layer 5 that exists at the lower portion of an electrode isolation area $D_0$ between the first and second signal electrodes 7a and 7b is removed, whereby at least a part of the upper surface of the buffer layer 4 is exposed. The insulating layer 5 may be removed in a part of the electrode isolation area $D_0$, not in the entire electrode isolation area $D_0$. The removal of the insulating layer 5 existing in the electrode isolation area $D_0$ between the first and second signal electrodes 7a and 7b allows velocity matching to be improved by adjusting the effective refractive index of the traveling-wave electrodes.

The electrode layer 7 is provided with the first signal electrode 7a and second signal electrode 7b. The first signal electrode 7a is provided overlapping the ridge part 2r corresponding to the first optical waveguide 10a so as to modulate light traveling inside the first optical waveguide 10a and is opposed to the first optical waveguide 10a through the buffer layer 4. The second signal electrode 7b is provided overlapping the ridge part 2r corresponding to the second optical waveguide 10b so as to modulate light traveling inside the second optical waveguide 10b and is opposed to the second optical waveguide 10b through the buffer layer 4.

As illustrated in FIG. 2, in the cross section obtained by vertically cutting the first and second optical waveguides 10a and 10b, the electrode structure is left-right symmetric. Thus, the magnitudes of electric fields to be from the first and second signal electrodes 7a and 7b to the respective first and second optical waveguides 10a and 10b can be made the same as much as possible, whereby the wavelength chirp can be reduced.

The dielectric layer 8 is formed of a material having a higher dielectric constant than at least air and is provided so as to cover the entire underlying surface on which the first and second signal electrodes 7a and 7b are formed. The thickness of the dielectric layer 8 is not particularly limited, but is preferably about 0.1 µm to 50 µm.

The dielectric layer 8 covers the upper and side surfaces of each of the first and second signal electrodes 7a and 7b and the upper surface of the insulating layer 5 or buffer layer 4 that does not overlap the first and second signal electrodes 7a and 7b in a plan view. In the electrode isolation area $D_0$ between the first and second signal electrodes 7a and 7b, the upper surface of the buffer layer 4 is exposed, and the dielectric layer 8 covers the upper surface of the buffer layer 4. Further, in areas $D_{1a}$ and $D_{1b}$ outside the respective first and second signal electrodes 7a and 7b, the upper surface of the insulating layer 5 is exposed, and the dielectric layer 8 covers the upper surface of the insulating layer 5.

There is no particular restriction on the formation area of the dielectric layer 8. Specifically, the dielectric layer 8 may selectively cover only the vicinity of the formation areas of the respective first and second signal electrodes 7a and 7b or may cover the entire surface of the substrate 1 including the vicinity of the formation areas of the respective first and second signal electrodes 7a and 7b. Thus, for example, the bias electrodes 9a and 9b may be covered or not with the dielectric layer 8. Further, according to the need, a configuration may be adopted, in which the dielectric layer 8 covers only the upper surfaces or side surfaces of the first and second signal electrodes 7a and 7b.

The dielectric constant and film thickness of the buffer layer 4 covering the waveguide layer 2 are substantially fixed as described above since they have influence on optical loss and VπL. However, when the first and second signal electrodes 7a and 7b are covered with the dielectric layer 8 as in the present embodiment, the effective refractive index of signal wave can be brought close to the effective refractive index of light, whereby velocity matching between signal wave and light can be improved. Further, the material, application portion and the film thickness of the dielectric layer 8 can be freely selected, and thus, the degree of freedom of design for control of modulation band, effective refractive index Nm, impedance matching, drive voltage Vn and the like can be increased as compared to the conventional techniques.

Although the waveguide layer 2 is not particularly limited in type so long as it is formed of an electro-optic material, it is preferably formed of lithium niobate ($LiNbO_3$). This is because lithium niobate has a large electro-optic constant and is thus suitable as the constituent material of an optical device such as an optical modulator. Hereinafter, the configuration of the present embodiment when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The "epitaxial film" refers to a film having the crystal orientation of the underlying substrate or film. Assuming that the film surface extends in X-Y plane and that the film thickness direction is Z-axis direction, the crystal of the epitaxial film is uniformly oriented along the X-axis and Y-axis on the film surface and along the Z-axis in the thickness direction. For example, the epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since $LiNbO_3$ has a trigonal crystal system structure, single-crystal $LiNbO_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_yA_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 μm. This is because a high-quality lithium niobate film having a thickness larger than 2 μm is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

The first signal electrode 7a has a two-layer structure and has an upper layer part $7a_H$ formed on the electrode layer 7 and a lower layer part $7a_L$ embedded in an opening (first opening) penetrating the insulating layer 5. The lower layer part $7a_L$ of the first signal electrode 7a is positioned at the end portion of the upper layer part $7a_H$ of the first signal electrode 7a close to the second signal electrode 7b. Accordingly, a lower surface (first lower surface) $Sa_L$ of the lower layer part $7a_L$ of the first signal electrode 7a is positioned closer to the second signal electrode 7b than a lower surface (second lower surface) $Sa_H$ of the upper layer part $7a_H$ is, and the width of the upper layer part $7a_H$ extends from the lower layer part $7a_L$ to the side opposite to the second signal electrode 7b. With such a cross-sectional structure, the first lower surface $Sa_L$ of the first signal electrode 7a contacts the upper surface of the buffer layer 4 above the first optical waveguide 10a to cover the first optical waveguide 10a through the buffer layer 4. The second lower surface $Sa_H$ of the first signal electrode 7a is positioned above the first lower surface $S_{aL}$ and does not contact the buffer layer 4.

A width $Wa_L$ (width of the first lower surface $Sa_L$) of the lower layer part $7a_L$ of the first signal electrode 7a is smaller than a width $W_{7a}$ (entire width of the first signal electrode 7a) of the upper layer part $7a_H$. The lower layer part $7a_L$ is formed only in the vicinity of an area that overlaps the first optical waveguide 10a in a plan view and is not formed in the other area. Thus, the width $Wa_L$ of the first lower surface $Sa_L$ of the first signal electrode 7a is slightly larger than the ridge width $W_0$ of the first optical waveguide 10a. To concentrate an electric field from the first signal electrode 7a on the first optical waveguide 10a, the width $Wa_H$ of the first lower surface $Sa_L$ of the first signal electrode 7a is preferably 1.1 times to 15 times, more preferably, 1.5 times to 10 times as large as the ridge width $W_0$ of the first optical waveguide 10a. To ensure a sufficient cross-sectional area of the upper layer part $7a_H$ of the first signal electrode 7a, the width $Wa_H$ of the second lower surface $Sa_H$ is preferably larger than the width $Wa_L$ of the first lower surface $Sa_L$.

The second signal electrode 7b also has a two-layer structure and has an upper layer part $7b_H$ formed on the electrode layer 7 and a lower layer part $7b_L$ embedded in an opening (second opening) penetrating the insulating layer 5. The lower layer part $7b_L$ of the second signal electrode 7b is positioned at the end portion of the upper layer part $7b_H$ of the second signal electrode 7b close to the first signal electrode 7a. Accordingly, a lower surface (first lower surface) $Sb_L$ of the lower layer part $7b_L$ of the second signal electrode 7b is positioned closer to the first signal electrode 7a than a lower surface (second lower surface) $Sb_H$ of the upper layer part $7b_H$ is, and the width of the upper layer part $7b_H$ extends from the lower layer part $7b_L$ to the opposite side of the first signal electrode 7a. With such a cross-sectional structure, the first lower surface $Sb_L$ of the second signal electrode 7b contacts the upper surface of the buffer layer 4 above the second optical waveguide 10b to cover the second optical waveguide 10b through the buffer layer 4. The second lower surface $Sb_H$ of the second signal electrode 7b is positioned above the first lower surface $Sb_L$ and does not contact the buffer layer 4.

A width $Wb_L$ (width of the first lower surface $Sb_L$) of the lower layer part $7b_L$ of the second signal electrode 7b is smaller than a width $W_{7b}$ (entire width of the second signal electrode 7b) of the upper layer part $7b_H$. The lower layer part $7b_L$ is formed only in the vicinity of an area that overlaps the second optical waveguide 10b in a plan view and is not formed in the other area. Thus, the width $Wb_L$ of the first lower surface $Sb_L$ of the second signal electrode 7b is slightly larger than the ridge width $W_0$ of the second optical waveguide 10b. To concentrate an electric field from the second signal electrode 7b on the second optical waveguide 10b, the width $Wb_L$ of the first lower surface $Sb_L$ of the second signal electrode 7b is preferably 1.1 times to 15 times, more preferably, 1.5 times to 10 times the ridge width $W_0$ of the second optical waveguide 10b. To ensure a sufficient cross-sectional area of the upper layer part $7b_H$ of the second signal electrode 7b, the width $Wb_H$ of the second lower surface $S_{bH}$ is preferably larger than the width $Wb_L$ of the first lower surface $Sb_L$.

The electrode layer 7 is provided with no ground electrode. When a ground electrode is provided in the electrode isolation area $D_0$ between the first and second signal electrodes 7a and 7b or areas $D_{1a}$ and $D_{1b}$ outside the respective first and second signal electrodes 7a and 7b, ripple or crosstalk increases and high-frequency characteristics deteriorate. Such deterioration in high-frequency characteristics is considered to be caused by a fact that the width or area of the ground electrode cannot sufficiently be ensured due to miniaturization of an optical modulator to result in an unstable ground potential. When no ground electrode is provided as in the present embodiment, ripple or crosstalk can be reduced to thereby improve high-frequency characteristics.

As described above, the electrode structure is left-right symmetric, and thus the entire width $W_{7a}$ and entire width $W_{7b}$ of the first and second signal electrodes 7a and 7b are equal to each other, the widths $Wa_L$ and $Wb_L$ of the lower surfaces $Sa_L$ and $Sb_L$ of the lower layer parts $7a_L$ and $7b_L$ are also equal to each other, and the widths $Wa_H$ and $Wb_H$ of the lower surfaces $Sa_H$ and $Sb_H$ of the upper layer parts $7a_H$ and $7b_H$ are also equal to each other.

The inner side surface of the lower layer part $7a_L$ of the first signal electrode 7a is flush with the inner side surface of the upper layer part $7a_H$ of the first signal electrode 7a, and the width of the upper layer part $7a_H$ extends from the lower layer part $7a_L$ to the side opposite to the second signal electrode 7b, so that the first signal electrode 7a has a substantially L-shape in cross section. The inner side surface of the lower layer part $7b_L$ of the second signal electrode 7b is flush with the inner side surface of the upper layer part $7b_H$ of the second signal electrode 7b, and the width of the upper layer part $7b_H$ extends from the lower layer part $7b_L$ to the side opposite to the first signal electrode 7a, so that the second signal electrode 7b also has a substantially L-shape in cross section. Accordingly, a gap between the lower layer part $7a_L$ and the lower layer part $7b_L$ and a gap between the upper layer part $7a_H$ and the upper layer part $7b_H$ are equal to each other, and both are $G_0$. The gap between two electrodes refers to the shortest distance therebetween in the X-direction.

As described above, in the optical modulator 100 according to the present embodiment, the first and second signal electrodes 7a and 7b each have a two-layer structure, and the widths $Wa_L$ and $Wb_L$ of the lower surfaces $Sa_L$ and $Sb_L$ of the lower layer parts $7a_L$ and $7b_L$ are smaller than the electrode widths (the maximum widths of the respective first and second signal electrodes 7a and 7b) $W_{7a}$ and $W_{7b}$ of the upper layer parts $7a_H$ and $7b_H$, respectively, so that an electric field can be concentrated on the first and second optical waveguides 10a and 10b, allowing improvement in electric field efficiency. Further, the electrode widths $W_{7a}$ and $W_{7b}$ of the upper layer parts $7a_H$ and $7b_H$ of the first and second signal electrodes 7a and 7b are larger than the widths $Wa_L$ and $Wb_L$ of the lower surfaces $Sa_L$ and $Sb_L$ of the lower layer parts $7a_L$ and $7b_L$, the cross-sectional area of the signal electrode can be increased, allowing a reduction in electrode loss at high frequencies. Thus, it is possible to realize an optical modulator having satisfactory high-frequency characteristics and capable of being driven with a low voltage. Further, the entire exposed surface of the electrode layer 7 including the first and second signal electrodes 7a and 7b is covered with the dielectric layer 8, so that the effective refractive index of signal wave can be brought close to the effective refractive index of light, whereby velocity matching between signal wave and light can be improved.

Figure 3:
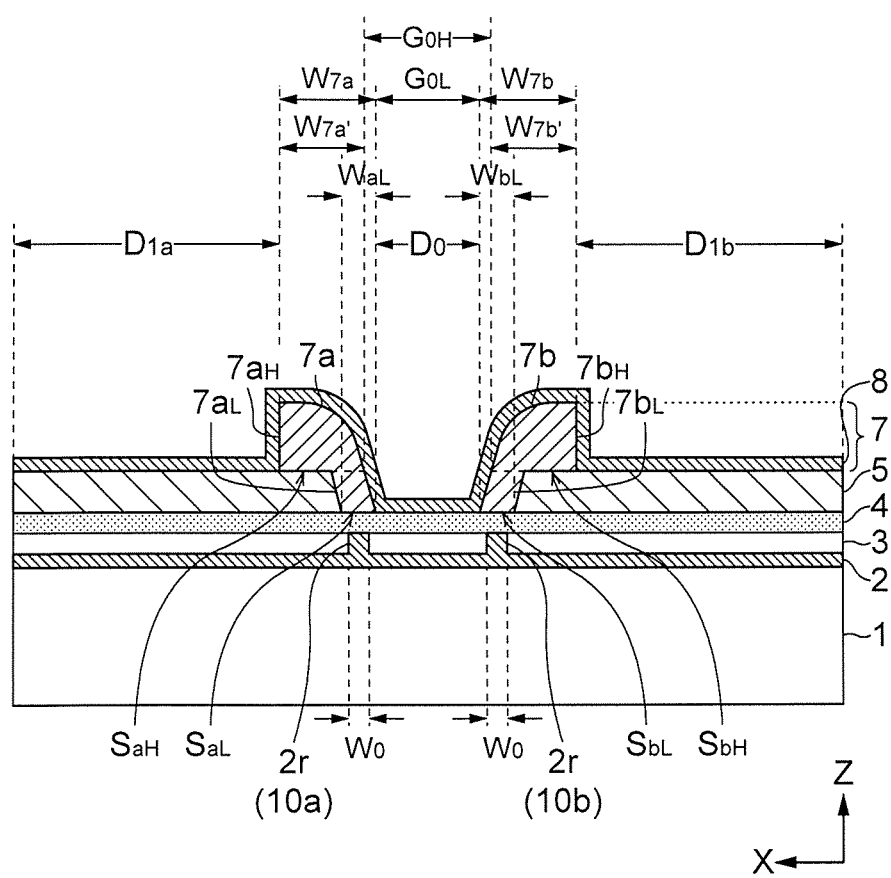
FIG. 3 is a schematic cross-sectional view illustrating the configuration of an optical modulator according to a second embodiment of the present invention.

FIG. 3 is a schematic cross-sectional view illustrating the configuration of an optical modulator according to a second embodiment of the present invention.

As illustrated in FIG. 3, an optical modulator 200 is a first modification of the optical modulator 100 illustrated in FIG. 2 and is featured in that the opening of the insulating layer 5 has an inclined inner wall surface. Correspondingly, the lower layer parts $7a_L$ and $7b_L$ of the first and second signal electrodes 7a and 7b are inclined and, further, the inner corners of the first and second signal electrodes 7a and 7b each have a gently rounded shape. Other configurations are the same as those of the first embodiment.

In the present embodiment, a gap $G_{0H}$ between the upper layer parts $7a_H$ and $7b_H$ of the first and second signal electrodes 7a and 7b is larger than the gap $G_{0L}$ between the lower layer parts $7a_L$ and $7b_L$, thereby facilitating velocity matching. The cross-sectional areas of the upper layer parts $7a_H$ and $7b_H$ of the first and second signal electrodes 7a and 7b are smaller than those in the first embodiment; however, the cross-sectional areas of the upper layer parts $7a_H$ and $7b_H$ are ensured by making the widths of the upper layer parts $7a_H$ and $7b_H$ larger than the widths of the lower layer parts $7a_L$ and $7b_L$, so that the same effects as in the first embodiment can be obtained. That is, the electrode widths $W_{7a}$ and $W_{7b}$ of the upper layer parts $7a_H$ and $7b_H$ are larger than the widths $Wa_L$ and $Wb_L$, of the lower surfaces $Sa_L$ and $Sb_L$ of the lower layer parts $7a_L$ and $7b_L$, so that it is possible to increase the cross-sectional area of the signal electrode as compared to when the widths of the first and second signal electrodes 7a and 7b are evenly reduced to thereby reduce an electrode loss at high frequencies. Thus, it is possible to realize an optical modulator having satisfactory high-frequency characteristics and capable of being driven with a low voltage.

Further, the first and second signal electrodes 7a and 7b are covered with the dielectric layer 8, so that the effective refractive index of signal wave can be brought close to the effective refractive index of light, whereby velocity matching between signal wave and light can be improved.

Figure 4:
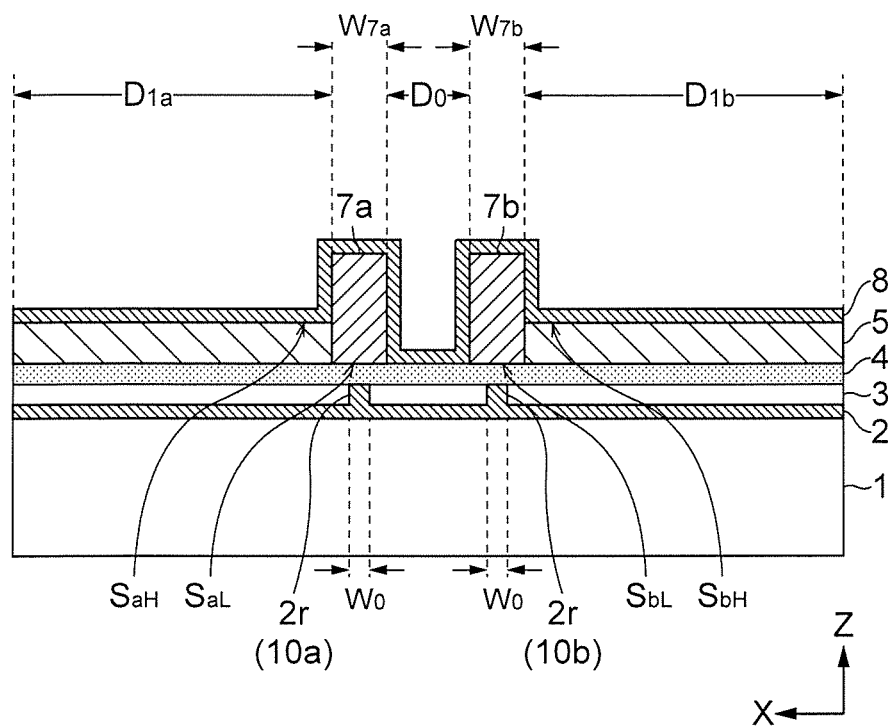
FIG. 4 is a schematic cross-sectional view illustrating the configuration of an optical modulator according to a third embodiment of the present invention.

FIG. 4 is a schematic cross-sectional view illustrating the configuration of an optical modulator according to a third embodiment of the present invention.

As illustrated in FIG. 4, an optical modulator 300 is a second modification of the optical modulator 100 illustrated in FIG. 2 and is featured in that the electrode width from the lower end to upper end of each of the first and second signal electrodes 7a and 7b is substantially constant and thus the widths of the upper layer parts $7a_H$ and $7b_H$ are equal respectively to the widths of the lower layer parts $7a_L$ and $7b_L$. Other configurations are the same as those of the first embodiment.

In the present embodiment, the widths of the upper layer parts $7a_H$ and $7b_H$ are not made larger than the respective widths of the lower layer parts $7a_L$ and $7b_L$, so that the effect of reducing an electrode loss at high frequencies cannot be expected; however, the first and second signal electrodes 7a and 7b are covered with the dielectric layer 8, so that the effective refractive index of signal wave can be brought close to the effective refractive index of light, whereby velocity matching between signal wave and light can be improved.

Figure 5:
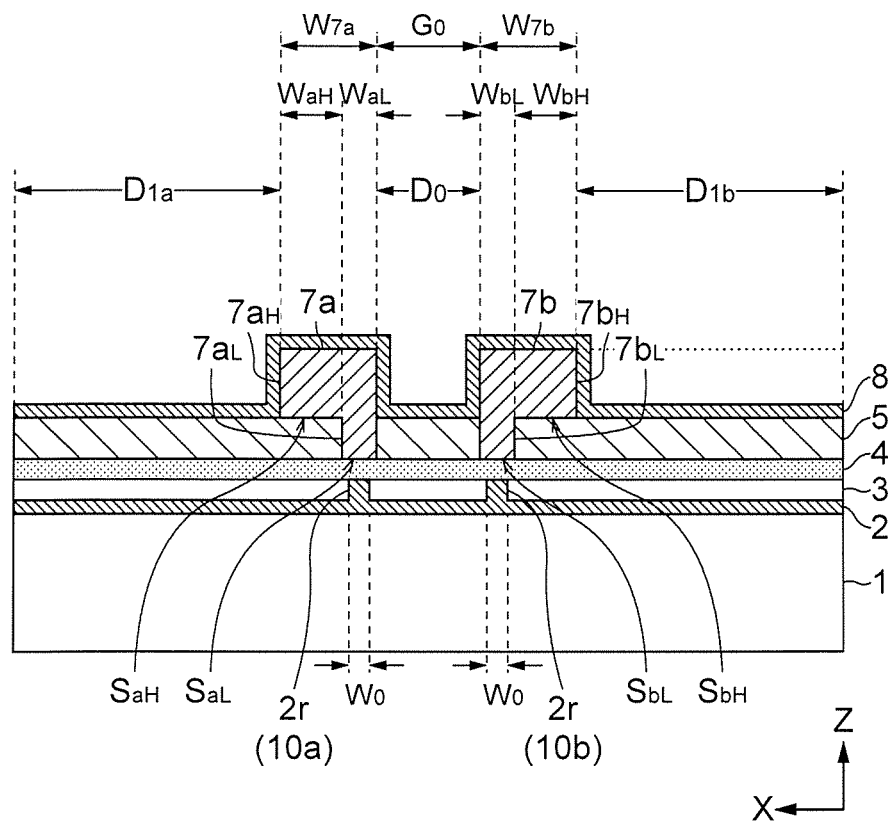
FIG. 5 is a schematic cross-sectional view illustrating the configuration of an optical modulator according to a fourth embodiment of the present invention.

FIG. 5 is a schematic cross-sectional view illustrating the configuration of an optical modulator according to a fourth embodiment of the present invention.

As illustrated in FIG. 5, an optical modulator 400 is a third modification of the optical modulator 100 illustrated in FIG. 2 and is featured in that the insulating layer 5 existing at the lower portion of the electrode isolation area $D_0$ between the first and second signal electrodes 7a and 7b is not removed. Therefore, in the electrode isolation area $D_0$, the dielectric layer 8 is formed on the upper surface of insulating layer 5. Thus, in the present embodiment, the insulating layer 5 exists in the electrode isolation area $D_0$ between the first and second signal electrodes 7a and 7b, so that the effective refractive index of the traveling-wave electrode can be increased to coincide with the effective refractive index of light to improve velocity matching.

Figure 6A:
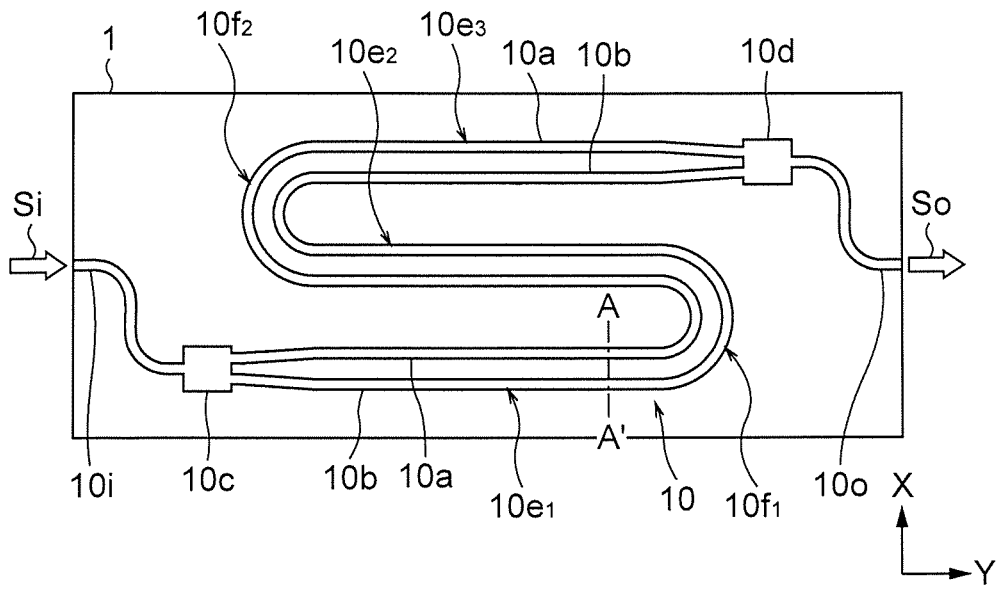
Figure 6B:
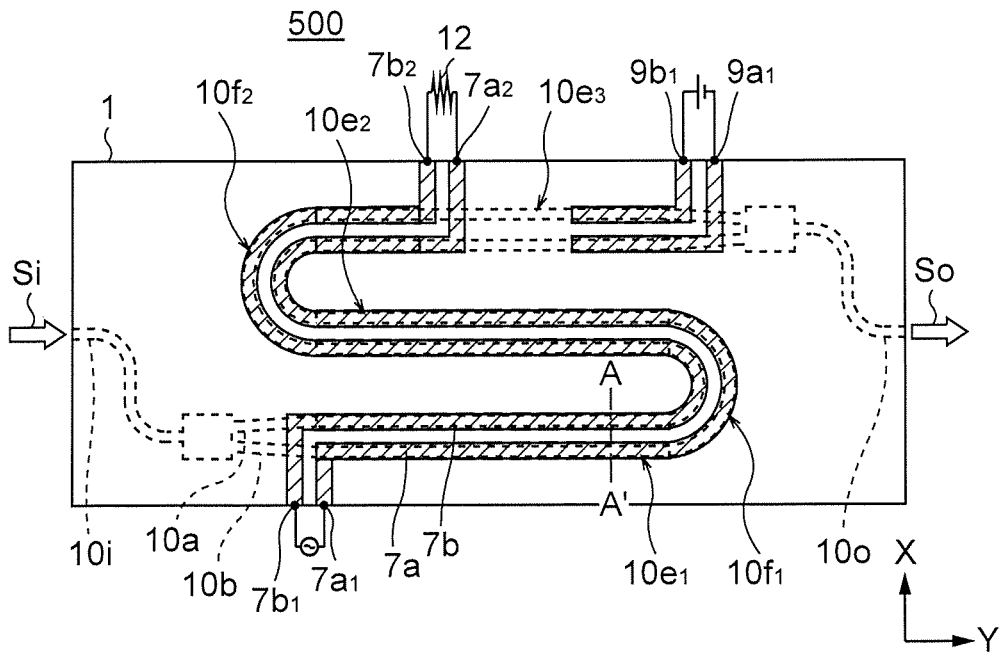

FIGS. 6A and 6B are schematic plan views illustrating the configuration of an optical modulator according to a fifth embodiment of the present invention. FIG. 6A illustrates only the optical waveguide, and FIG. 6B illustrates the entire configuration of the optical modulator including the traveling-wave electrodes.

As illustrated in FIGS. 6A and 6B, an optical modulator 500 according to the present embodiment is featured in that the Mach-Zehnder optical waveguide 10 is constructed by a combination of a linear section and a curved section. Specifically, the Mach-Zehnder optical waveguide 10 has first to third linear sections $10e_1$, $10e_2$ and $10e_3$ arranged parallel to one another, a first curved section $10f_1$ connecting the first and second linear sections $10e_1$ and $10e_2$, and a second curved section $10f_2$ connecting the second and third linear sections $10e_2$ and $10e_3$. The first and second curved sections $10f_1$ and $10f_2$ are formed into concentric half circles so as to turn the traveling direction of the optical waveguide by 180°.

In the optical modulator 500 according to the present embodiment, the cross-sectional structures of the respective linear sections $10e_1$, $10e_2$ and $10e_3$ of the Mach-Zehnder optical waveguide 10 taken along line A-A' in FIGS. 6A and 6B are each formed into those illustrated in FIGS. 2 to 5. That is, the first lower surface $S_{aL}$ of the first signal electrode 7a covers the first optical waveguide 10a at the first to third linear sections $10e_1$, $10e_2$ and $10e_3$ through the buffer layer 4, and the first lower surface $Sb_L$ of the second signal electrode 7b covers the second optical waveguide 10b at the first to third linear sections $10e_1$, $10e_2$ and $10e_3$ through the buffer layer 4. Further, the dielectric layer 8 that covers the entire upper surface of the electrode layer 7 including the first and second signal electrodes 7a and 7b is provided. Although the first and second bias electrodes 9a and 9b are not particularly limited in position, they cover the first and second optical waveguides 10a and 10b at the other part of the third linear section $10e_3$. Although, in the present embodiment, the first and second signal electrodes 7a and 7b each entirely cover the first and second linear sections $10e_1$ and $10e_2$ and a part of the third linear section $10e_3$, they may each cover only, e.g., the first linear section $10e_1$.

In the present embodiment, the light Si is input to one end of the first linear section $10e_1$, travels therefrom toward the other end thereof, makes a U-turn at the first curved section $10f_1$, travels from one end of the second linear section $10e_2$ toward the other end thereof in the direction opposite to the first linear section $10e_1$, makes a U-turn at the second curved section $10f_2$, and travels from one end of the third linear section $10e_3$ toward the other end thereof in the same direction as the first linear section $10e_1$.

The optical modulator has a problem of a long element length in practical applications. However, by folding the optical waveguide as illustrated, the element length can be significantly reduced, obtaining a remarkable effect for miniaturization. Particularly, the optical waveguide formed of the lithium niobate film is featured in that it has small loss even when the curvature radius of the curved section is reduced up to about 50 μm and is thus suitable for the present embodiment. The dielectric layer 8 need not be formed over the entire underlying surface but may selectively be formed on the required area.

When the optical waveguide has the curved section as described above, and a ground electrode is provided in the vicinity of the curved section, leak of a high-frequency signal increases at the curved section, making high-frequency characteristics likely to be deteriorated. However, when no ground electrode is provided in the vicinity of the curved section, leak of a high-frequency signal at the curved section can be suppressed to thereby suppress deterioration in high-frequency characteristics.

Figure 7:
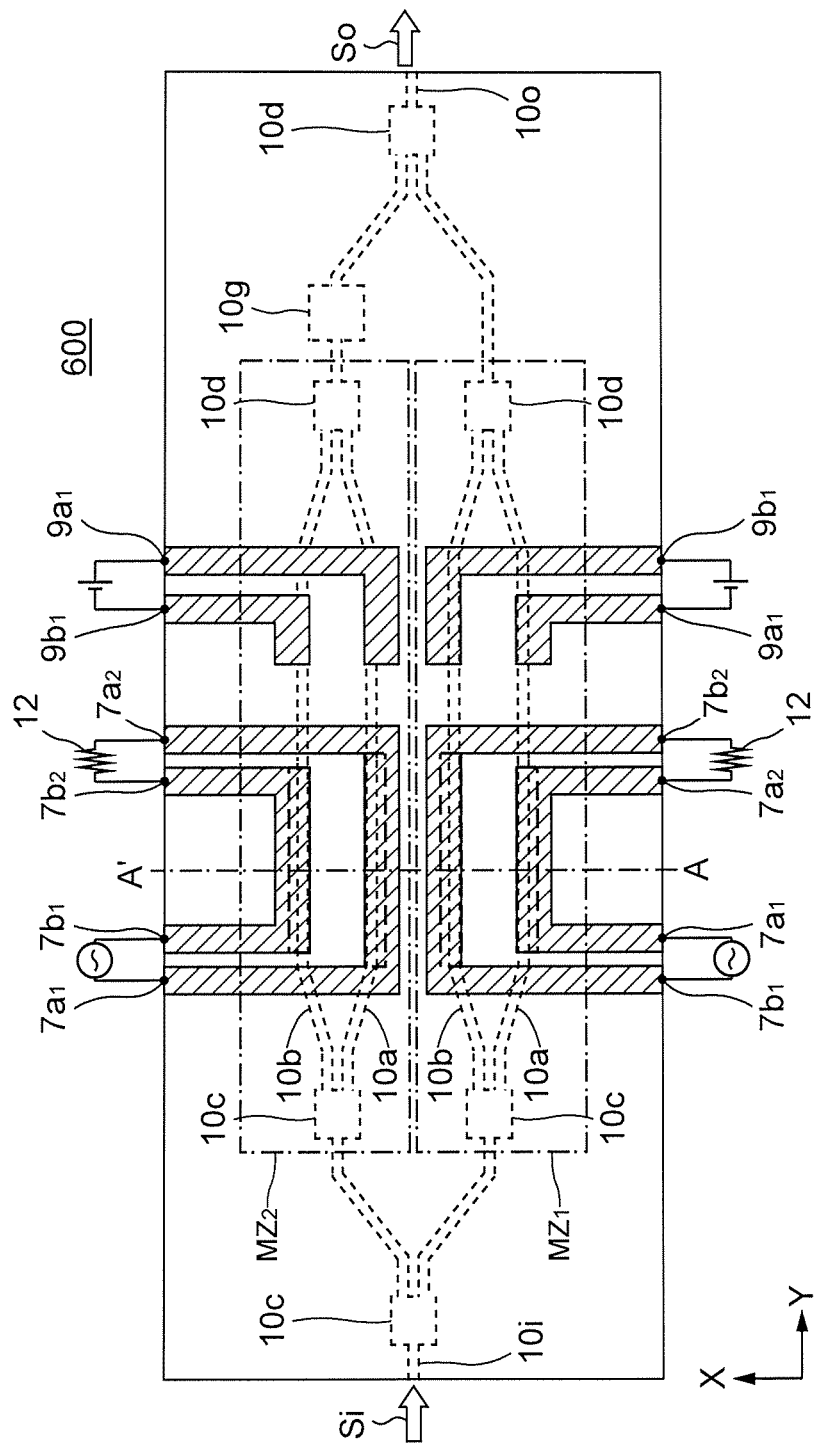
FIG. 7 is a schematic plan view illustrating the configuration of an optical modulator according to a sixth embodiment of the present invention.

FIG. 7 is a schematic plan view illustrating the configuration of an optical modulator according to a sixth embodiment of the present invention.

As illustrated in FIG. 7, an optical modulator 600 according to the present embodiment is featured in that it has a two-channel array structure in which two interaction parts of the Mach-Zehnder optical modulating element are arranged on the substrate 1 and uses the two interaction parts to perform quadrature phase shift keying (QPSK) or cross quadrature amplitude modulation (xQAM) for the input light Si. The optical modulator 600 according to the present embodiment is an IQ optical modulator constituted using first and second interaction parts $MZ_1$ and $MZ_2$, and a phase shifter 10g is provided at the output side of the second interaction part $MZ_2$. The configuration of each of the interaction parts $MZ_1$ and $MZ_2$ is the same as that of the single interaction part of the Mach-Zehnder optical modulating element illustrated in FIG. 1. Different differential signals are applied respectively to a pair of RF signal input terminals of the first and second interaction parts $MZ_1$ and $MZ_2$.

The input waveguide 10i constituted by a single optical waveguide is divided into four parts by two-stage demultiplexer 10c to form two pairs of optical waveguides (each pair consisting of two optical waveguides). That is, first and second optical waveguides 10a and 10b constituting the first interaction part $MZ_1$ and first and second optical waveguides 10a and 10b constituting the second interaction part $MZ_2$ are formed. At the output side, the optical waveguides are combined into a single output waveguide 10o by two-stage multiplexer 10d.

In the present embodiment as well, no ground electrode is provided in the vicinity of the first and second signal electrodes 7a and 7b. In particular, no ground electrode is provided at an interchannel region between the second signal electrode 7b of the first interaction part $MZ_1$ and the first signal electrode 7a of the second interaction part $MZ_2$. Further, the first and second signal electrodes 7a and 7b of each of the first and second interaction parts $MZ_1$ and $MZ_2$ are covered with the dielectric layer 8.

Figure 8:
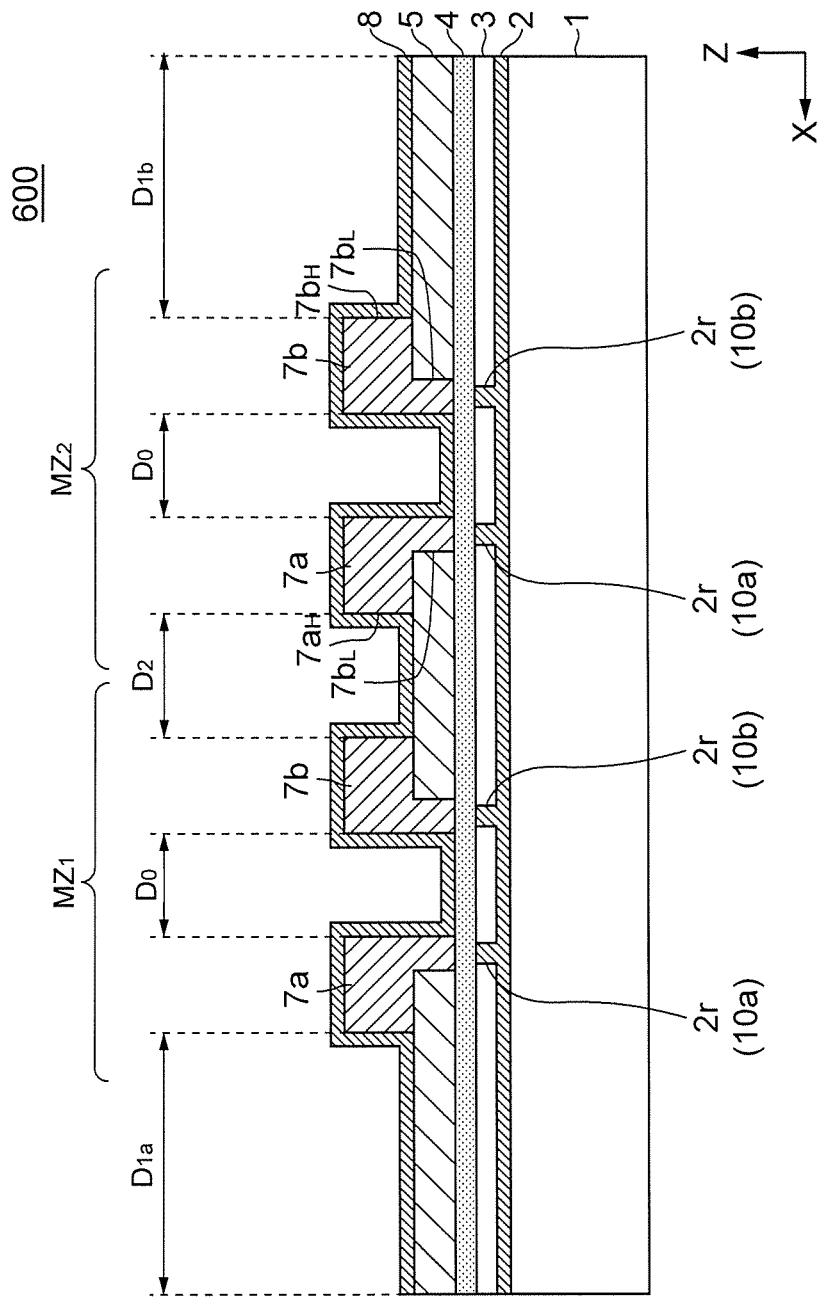
FIG. 8 is a schematic cross-sectional view of the optical modulator taken along line A-A' in FIG. 7.

FIG. 8 is a schematic cross-sectional view of the optical modulator taken along line A-A' in FIG. 7.

As illustrated in FIG. 8, each of the first and second interaction parts $MZ_1$ and $MZ_2$ has the first and second optical waveguides 10a and 10b and the first and second signal electrodes 7a and 7b provided above the buffer layer 4. The second optical waveguide 10b and second signal electrode 7b of the first interaction part $MZ_1$ are adjacent respectively to the first optical waveguide 10a and first signal electrode 7a of the second interaction part $MZ_2$.

As described above, the first and second signal electrodes 7a and 7b of each of the first and second interaction parts $MZ_1$ and $MZ_2$ are covered with the dielectric layer 8. Thus, the effective refractive indices of the first and second signal electrodes 7a and 7b can be increased, allowing the effective refractive index of the traveling-wave electrodes to coincide with the effective refractive index of light to improve velocity matching.

Figure 9:
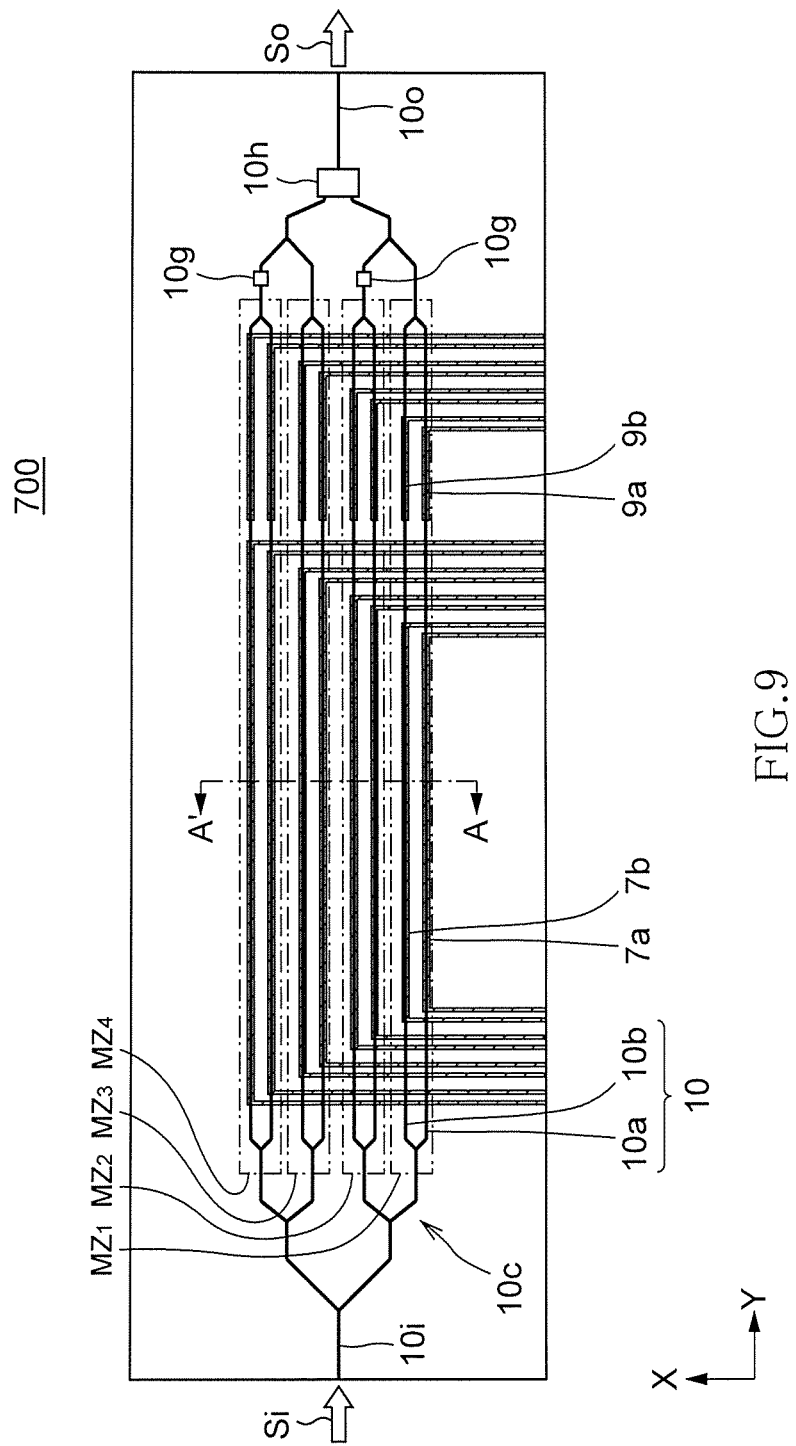
FIG. 9 is a schematic plan view illustrating the configuration of an optical modulator according to a seventh embodiment of the present invention.

FIG. 9 is a schematic plan view illustrating the configuration of an optical modulator according to a seventh embodiment of the present invention.

As illustrated in FIG. 9, an optical modulator 700 according to the present embodiment is featured in that it has a four-channel array structure in which four interaction parts $MZ_1$, $MZ_2$, $MZ_3$ and $MZ_4$ are arranged on the substrate 1 and uses the four interaction parts to perform dual polarization quadrature phase shift keying (DP-QPSK). The first and second interaction parts $MZ_1$ and $MZ_2$ constitute a first IQ optical modulator and the third and fourth interaction parts $MZ_3$ and $MZ_4$ constitute a second IQ optical modulator. An output of each of the first and second IQ modulators is output through a polarization multiplexing waveguide 10h. The configuration of each of the interaction parts $MZ_1$ to $MZ_4$ is the same as that of the single interaction part of the Mach-Zehnder optical modulating element illustrated in FIG. 1.

Figure 10:
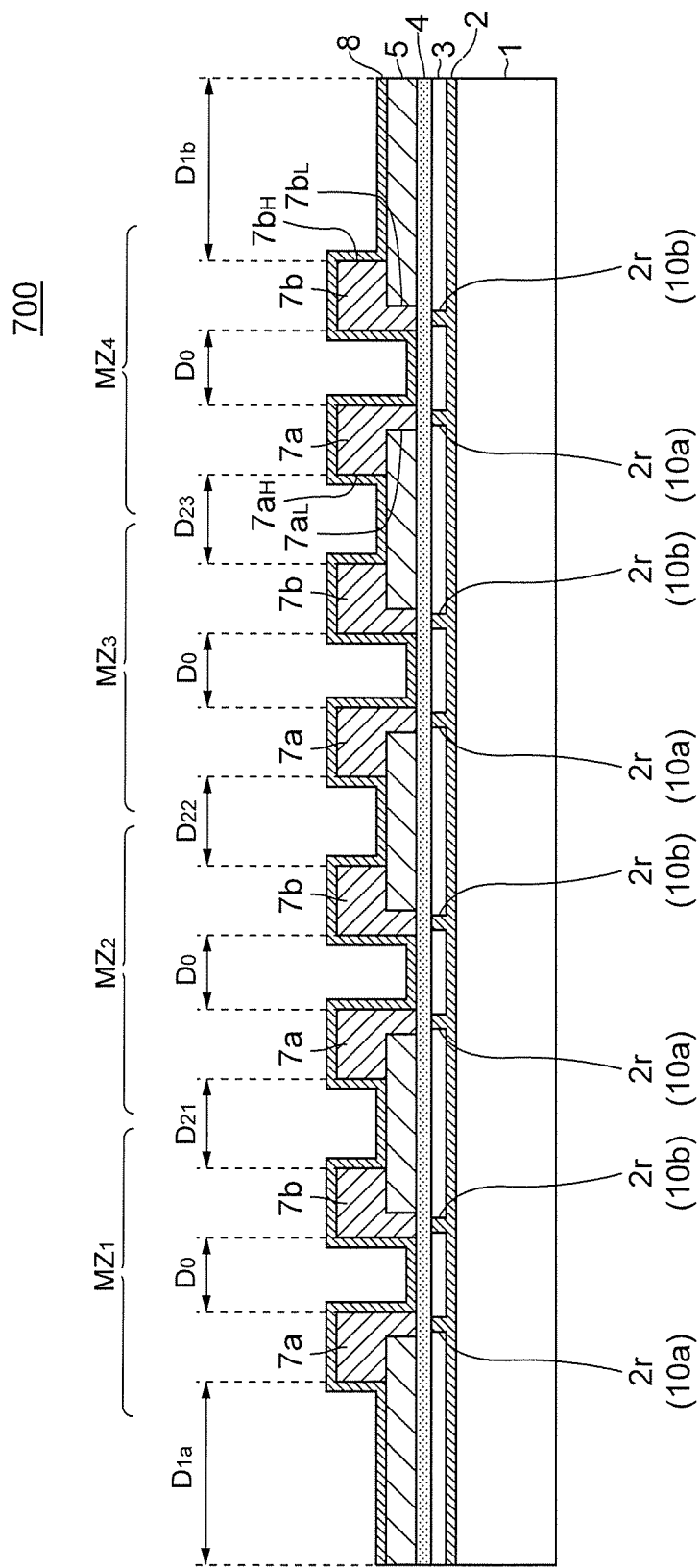
FIG. 10 is a schematic cross-sectional view of the optical modulator taken along line A-A' in FIG. 9.

FIG. 10 is a schematic cross-sectional view of the optical modulator taken along line A-A' in FIG. 9.

As illustrated in FIG. 10, each of the first to fourth interaction parts $MZ_1$ to $MZ_4$ has the first and second optical waveguides 10a and 10b and the first and second signal electrodes 7a and 7b provided above the buffer layer 4. The second optical waveguide 10b and second signal electrode 7b of the first interaction part $MZ_1$ are adjacent respectively to the first optical waveguide 10a and first signal electrode 7a of the second interaction part $MZ_2$, the second optical waveguide 10b and second signal electrode 7b of the second interaction part $MZ_2$ are adjacent respectively to the first optical waveguide 10a and first signal electrode 7a of the third interaction part $MZ_3$, and the second optical waveguide 10b and second signal electrode 7b of the third interaction part $MZ_3$ are adjacent respectively to the first optical waveguide 10a and first signal electrode 7a of the fourth interaction part $MZ_4$.

As described above, no ground electrode is provided in an interchannel region $D_{21}$ between the second signal electrode 7b of the first interaction part $MZ_1$ and the first signal electrode 7a of the second interaction part $MZ_2$, an interchannel region $D_{22}$ between the second signal electrode 7b of the second interaction part $MZ_2$ and the first signal electrode 7a of the third interaction part $MZ_3$, and an interchannel region $D_{23}$ between the second signal electrode 7b of the third interaction part $MZ_3$ and the first signal electrode 7a of the fourth interaction part $MZ_4$. This allows reduction in crosstalk between adjacent channels which cause a particular problem in an optical modulator having a multichannel structure. Further, the first and second signal electrodes 7a and 7b are covered with the dielectric layer 8, allowing improvement in velocity matching.

Figure 11:
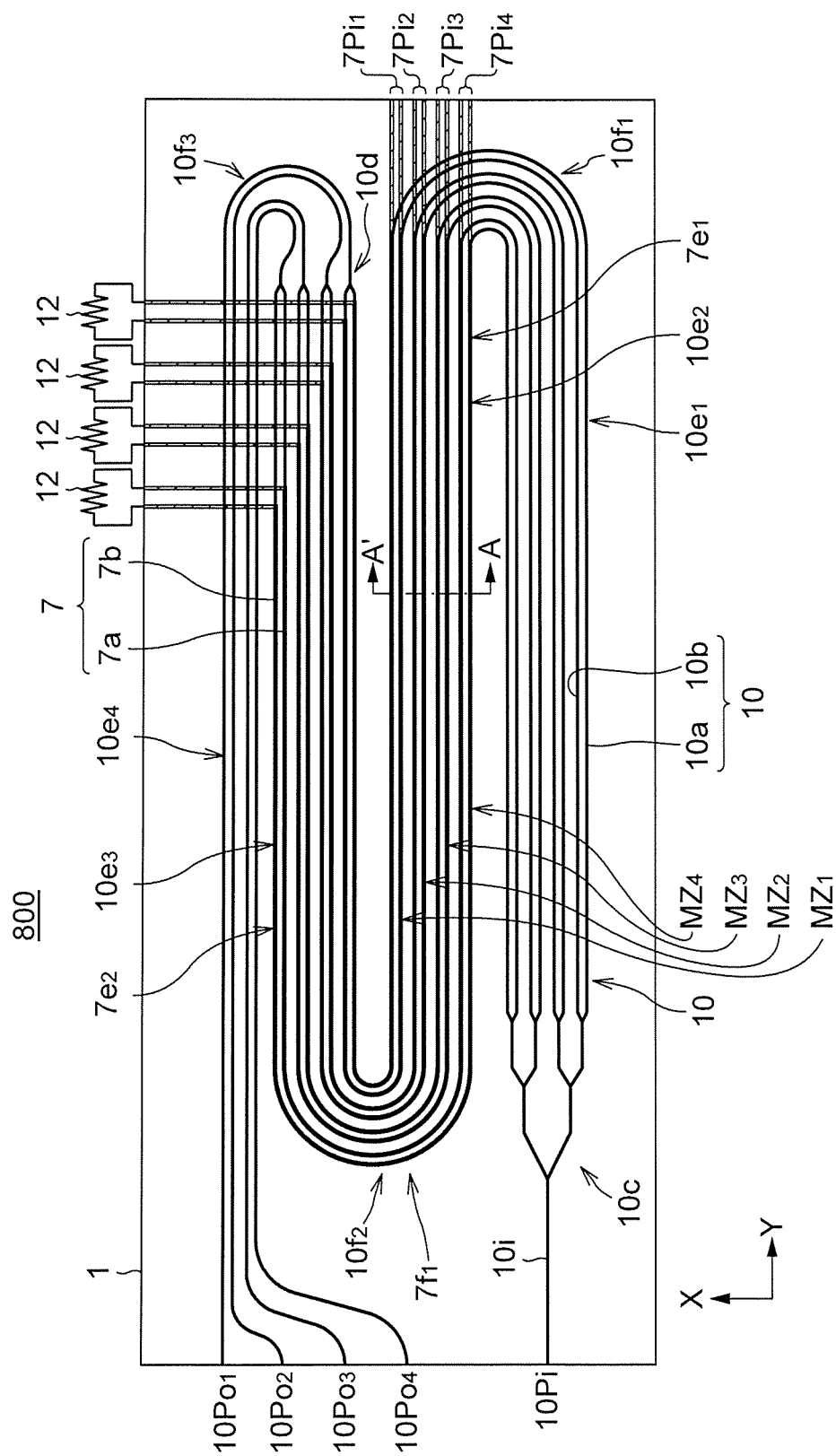
FIG. 11 is a schematic plan view illustrating the configuration of an optical modulator according to an eighth embodiment of the present invention.

FIG. 11 is a schematic plan view illustrating the configuration of an optical modulator according to an eighth embodiment of the present invention.

As illustrated in FIG. 11, an optical modulator 800 according to the present embodiment is featured in that, in the four-channel optical modulator illustrated in FIG. 10, the Mach-Zehnder optical waveguide of each of the interaction parts $MZ_1$ to $MZ_4$ is constructed by a combination of a linear section and a curved section. That is, the optical modulator 800 according to the present embodiment is obtained by combining the optical modulators according to the fifth and seventh embodiments. The cross-sectional structure taken along line A-A' in FIG. 11 is the same as that illustrated in FIG. 10, and the dielectric layer 8 covers the first and second signal electrodes 7a and 7b of each of the interaction parts $MZ_1$ to $MZ_4$, allowing improvement in velocity matching.

Figure 12:
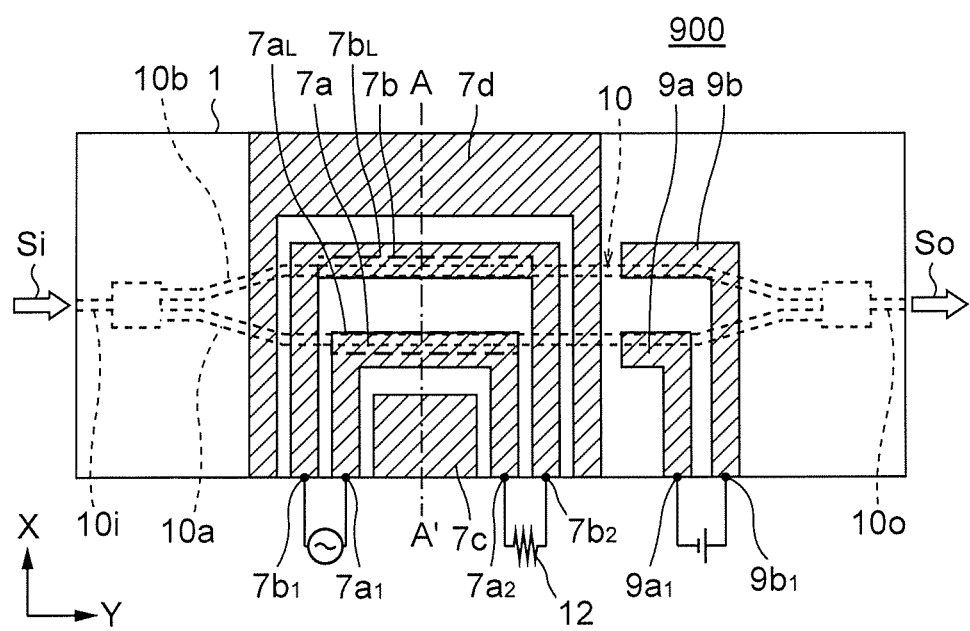
FIG. 12 is a schematic plan view illustrating the configuration of an optical modulator according to a ninth embodiment of the present invention.
Figure 13:
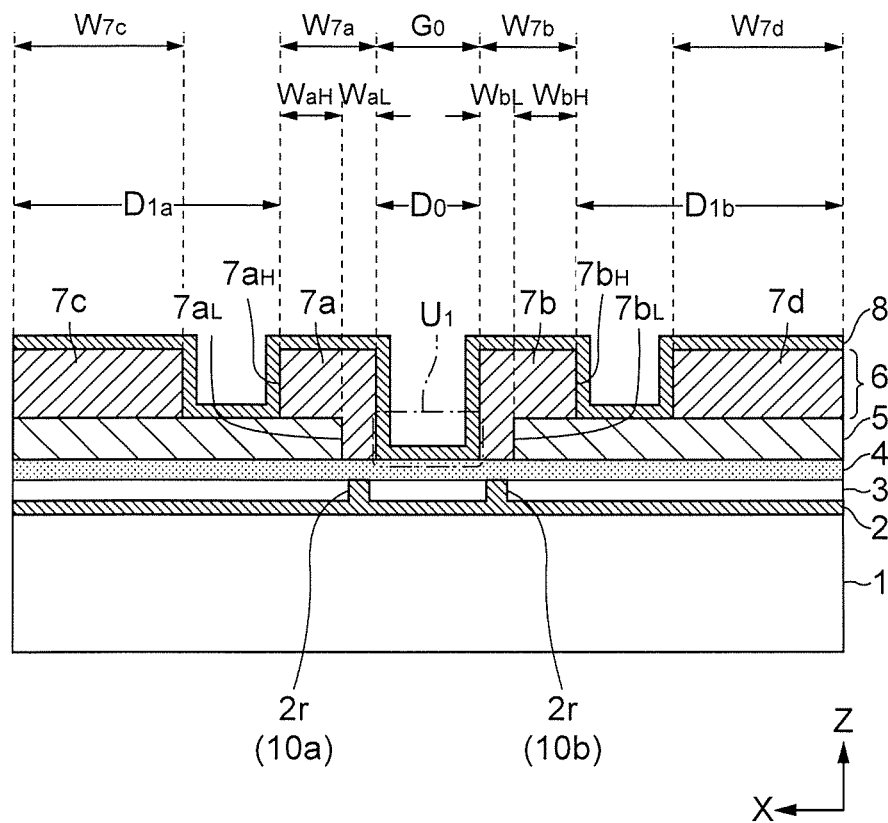
FIG. 13 is a schematic cross-sectional view of the optical modulator taken along line A-A' in FIG. 12.

FIG. 12 is a schematic plan view illustrating the configuration of an optical modulator according to a ninth embodiment of the present invention. FIG. 13 is a schematic cross-sectional view of the optical modulator taken along line A-A' in FIG. 12.

As illustrated in FIGS. 12 and 13, an optical modulator 900 according to the present embodiment is featured in that first and second ground electrodes 7c and 7d are provided respectively in the areas $D_{1a}$ and $D_{1b}$ outside the respective first and second signal electrodes 7a and 7b. The first ground electrode 7c is disposed in the vicinity of the first signal electrode 7a and at the side opposite to the second signal electrode 7b with respect to the first signal electrode 7a. The second ground electrode 7d is disposed in the vicinity of the second signal electrode 7b and at the side opposite to the first signal electrode 7a with respect to the second signal electrode 7b. Other configurations are the same as those of the first embodiment.

Although the first and second ground electrodes 7c and 7d each have a single-layer structure including only a conductor provided in the electrode layer 7, they may each have a two-layer structure like the first and second signal electrodes 7a and 7b. That is, the first and second ground electrodes 7c and 7d may each include a conductor embedded in openings formed in the insulating layer 5 and contacting the upper surface of the buffer layer 4. Further, the first and second ground electrodes 7c and 7d may each include a conductor embedded in openings penetrating the insulating layer 5 and buffer layer 4 and contacting the upper surface of the protective layer 3.

Widths $W_{7c}$ and $W_{7d}$ of the first and second ground electrodes 7c and 7d are preferably larger than the widths $W_{7a}$ and $W_{7b}$ of the first and second signal electrodes 7a and 7b. By setting the areas of the first and second ground electrodes 7c and 7d larger than the areas of the first and second signal electrodes 7a and 7b, respectively, radiation loss can be reduced to thereby obtain satisfactory high-frequency characteristics. The width $W_{7c}$ of the first ground electrode 7c may be equal to or different from the width $W_{7d}$ of the second ground electrode 7d.

In the present embodiment as well, the first and second signal electrodes 7a and 7b of each of the first and second interaction parts $MZ_1$ and $MZ_2$ are covered with the dielectric layer 8. Thus, the effective refractive indices of the first and second signal electrodes 7a and 7b can be increased, allowing the effective refractive index of the traveling-wave electrodes to coincide with the effective refractive index of light to improve velocity matching.

Figure 14:
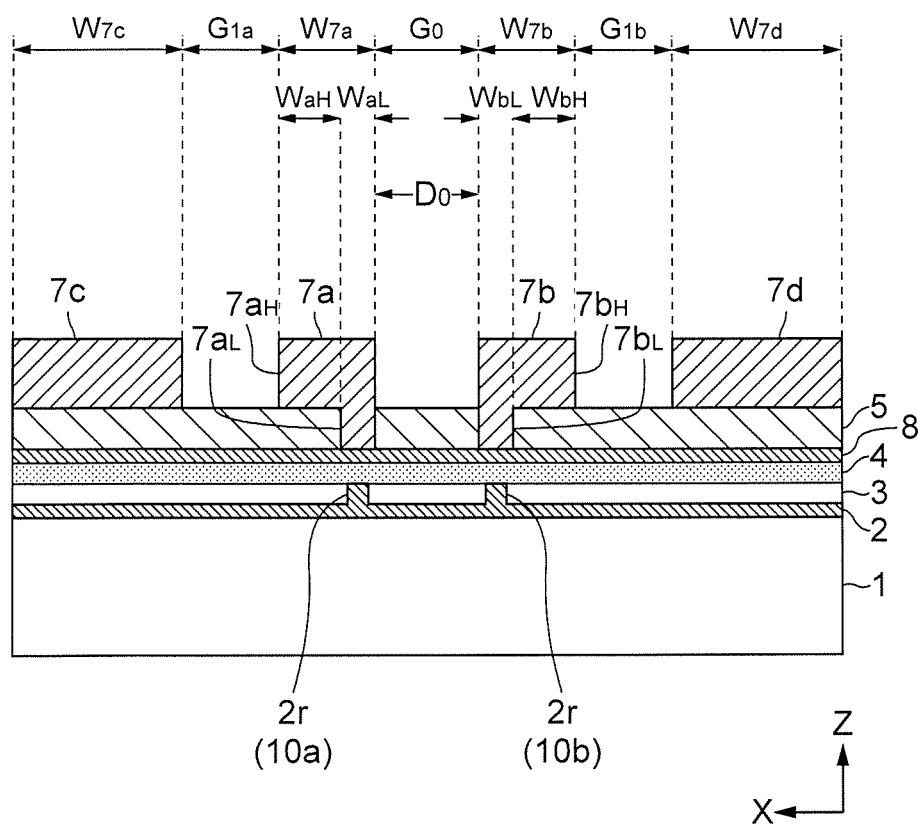
FIG. 14 is a schematic cross-sectional view illustrating the configuration of an optical modulator according to a 10th embodiment.

FIG. 14 is a schematic cross-sectional view illustrating the configuration of an optical modulator according to a 10th embodiment.

As illustrated in FIG. 14, an optical modulator 1000 according to the present embodiment is featured in that the dielectric layer 8 is provided between the buffer layer 4 and the insulating layer 5. Specifically, the dielectric layer 8 is formed on the upper surface of the buffer layer 4, and the insulating layer 5 and lower layer parts $7a_L$ and $7b_L$ of the first and second signal electrodes 7a and 7b are formed on the upper surface of the dielectric layer 8.

The dielectric layer 8 covers the entire upper surface of the buffer layer 4 and is thus formed not only in an area not overlapping the first and second signal electrodes 7a and 7b in a plan view but also in an area overlapping the first and second signal electrodes 7a and 7b and first and second ground electrodes 7c and 7d in a plan view. On the other hand, the upper and side surfaces of each of the first and second signal electrodes 7a and 7b are not covered with the dielectric layer 8 but exposed. Although the first and second ground electrodes 7c and 7d are provided in the electrode layer 7 in the present embodiment, they may be omitted as in FIG. 2. Other configurations are the same as those of the first embodiment.

As described above, in the optical modulator 1000 according to the present embodiment, the dielectric layer 8 is provided on the upper surface of the buffer layer 4, so that the effective refractive index of microwave can be increased as in the first embodiment to allow improvement in velocity matching between signal wave and light.

While the preferred embodiments of the present invention have been described, the present invention is not limited to the above embodiments, and various modifications may be made within the scope of the present invention, and all such modifications are included in the present invention.

For example, in the above embodiments, the optical modulator has the pair of optical waveguides 10a and 10b each formed of the lithium niobate film epitaxially grown on the substrate 1; however, the present invention is not limited to such a structure, but the optical waveguides may be formed of an electro-optic material such as barium titanate or lead zirconium titanate. However, the optical waveguide formed of the lithium niobate film can be reduced in width, so that a problem of electric field concentration is conspicuous, and thus the effects of the present invention are great. Further, as the waveguide layer 2, a semiconductor material, a polymer material or the like having electro-optic effect may be used.

Further, although the lower surfaces of the respective first and second signal electrodes 7a and 7b each have a two-step structure in the present invention, they may each have a step structure of three or more steps. In this case, a surface contacting the buffer layer 4 is the lower surface of the lower layer part. Further, the lower layer parts of the first and second signal electrodes 7a and 7b may have a tapered shape in which the widths thereof are gradually reduced toward the first and second optical waveguides 10a and 10b, respectively.

EXAMPLES

Electric field efficiency of an optical modulator having a cross-sectional structure illustrated in FIG. 2 was evaluated by simulation. In this optical modulator, the substrate 1 was a sapphire single crystal substrate (specific dielectric constant: 10), the waveguide layer 2 was formed of a lithium niobate film, the protective layer 3 was formed of $SiO_2$ (specific dielectric constant: 4), the buffer layer was formed of an oxide La-AL-O (specific dielectric constant: 13) composed of La, Al and the like, the insulating layer 5 was formed of an oxide (specific dielectric constant: 8), the electrode layer 7 was made of Au, and the dielectric layer 8 was formed of polyimide. The thickness of the waveguide layer 2 was 1.5 μm, the slab thickness of the waveguide layer 2 was 0.4 μm (the thickness of the ridge part 2r was 1.1 μm), the ridge width $W_0$ of the waveguide layer 2 was 1.2 μm, the thickness of the buffer layer was 0.9 μm, the gap between the first and second waveguides was 18 μm, the thickness H of the insulating layer 5 was 2 μm, the width $W_{7a}$ of the upper layer part of the signal electrode was 9 μm (=$W_{7b}$), the width $Wa_L$ of the lower layer part of the signal electrode was 3 μm (=$Wb_L$), the thickness T of the electrode layer 7 was 3 μm, the thickness of the dielectric layer 8 was 3 μm, and the electrode length (interaction length) of the signal electrode along the optical waveguide was 20 mm.

In the above configuration, when a signal frequency was 32 GHz, a half-wavelength voltage Vπ of 3.8 V and a bandwidth of 44 GHz were obtained and, thus, an optical modulator operating at 64 Gbaud can be obtained while supporting a wide bandwidth and achieving low voltage operation.

Figure 17:
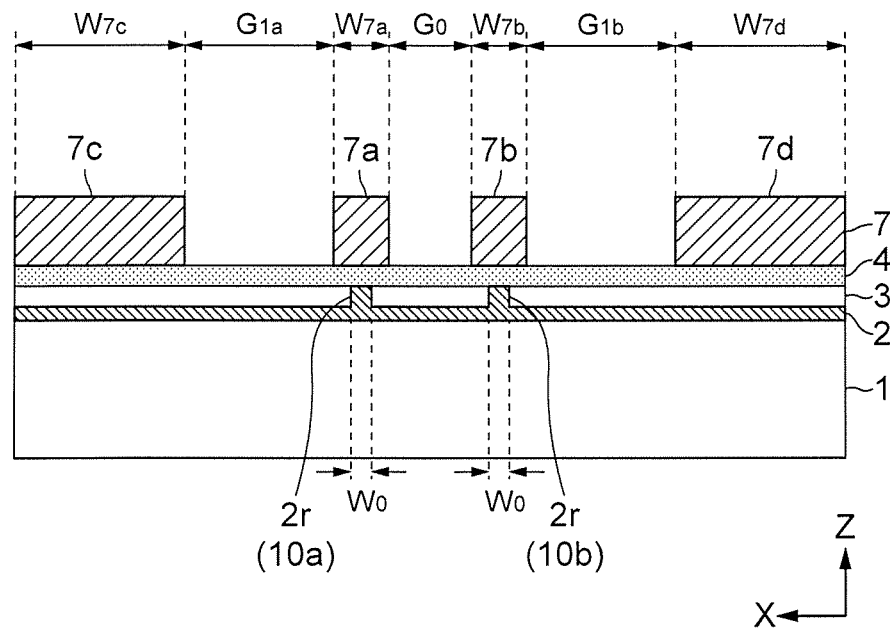
FIG. 17 is a cross-sectional view illustrating a structure of an optical modulator 600 according to an comparative example (H=0)

Next, in an optical modulator having the cross-sectional structure illustrated in FIG. 2, a change in VπL when the thickness (thickness H of the insulating layer 5) of each of the lower layer parts $7a_L$ and $7b_L$ of the first and second signal electrodes 7a and 7b was changed was calculated by simulation. The VπL is a parameter representing electric field efficiency, and the smaller the VπL is, the higher the electric field efficiency becomes. Vπ is half-wavelength voltage, and L is electrode length. The thickness H of the insulating layer 5, which is a variable parameter, was set to six values of 0 μm (no level difference), 0.5 μm, 1 μm, 2 μm, 3 μm and 4 μm. The cross-sectional structure of an optical modulator 600 in which the thickness H of the insulating layer 5 is set to 0 μm is illustrated in FIG. 17. The optical modulator 600 differs from the modulator 100 of FIG. 2 in that the insulating layer 5 is absent between the buffer layer 4 and the electrode layer 7 and thus the first and second signal electrodes 7a and 7b are formed on the upper surface of the buffer layer 4. The width $W_{7a}$ (=$W_{7b}$) of each of the first and second signal electrodes 7a and 7b are each 9 μm.

Figure 15:
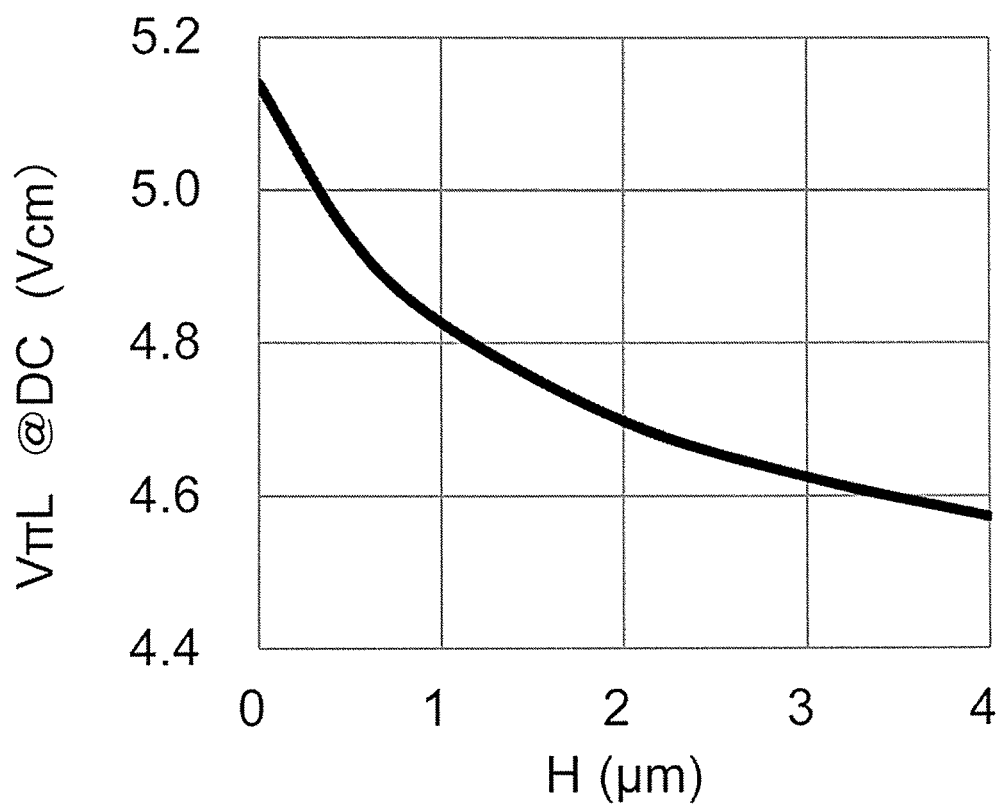
FIG. 15 is a graph illustrating the simulation result of the VmL (electric field efficiency) when the height of the step of the signal electrodes (the thickness H of the insulating layer) is changed.

FIG. 15 is a graph illustrating the simulation result of the VπL. In FIG. 15, the horizontal axis indicates the thickness H (μm) of the insulating layer 5, and the vertical axis indicates the VπL (V cm). As can be seen from FIG. 15, providing the insulating layer 5 (H>0 μm) can improve the electric field efficiency even when the maximum width of the signal electrode is increased. In addition, it can be seen that the larger the thickness H of the insulating layer 5 is, the more the electric field efficiency is improved.

Next, in an optical modulator having the cross-sectional structure illustrated in FIG. 2, a change in electrode loss when the width $W_{7a}$ (=$W_{7b}$=$W_7$) of each of the upper layer parts $7a_H$ and $7b_H$ of the first and second signal electrodes 7a and 7b was changed was calculated. The width $W_7$ of each of the upper layer parts $7a_H$ and $7b_H$, which is a variable parameter, was set to four values of 3 μm, 5 μm, 7 μm and 9 μm. The thickness H of the insulating layer 5 was set to three values of 0 μm, 2 μm and 4 μm.

Figure 16:
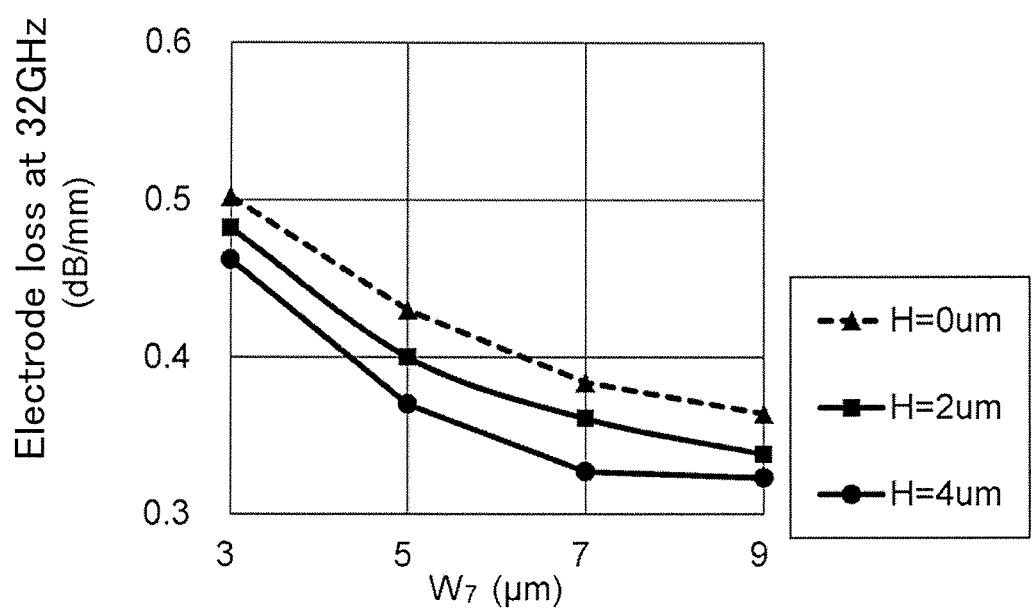
FIG. 16 is a graph illustrating the simulation result of an electrode loss when the width $W_7$ ($=W_{7a}=W_{7b}$) of each of the upper layer parts $7a_H$ and $7b_H$ of the signal electrodes is changed.

FIG. 16 is a graph illustrating the simulation result of an electrode loss. In FIG. 16, the horizontal axis indicates the width $W_7$ (μm) of each of the upper layer parts $7a_H$ and $7b_H$ of the signal electrodes, and the vertical axis indicates an electrode loss (dB/mm). As can be seen from FIG. 16, the larger the width $W_7$ of each of the upper layer parts $7a_H$ and $7b_H$ is, the smaller the electrode loss becomes.

Figure 18:
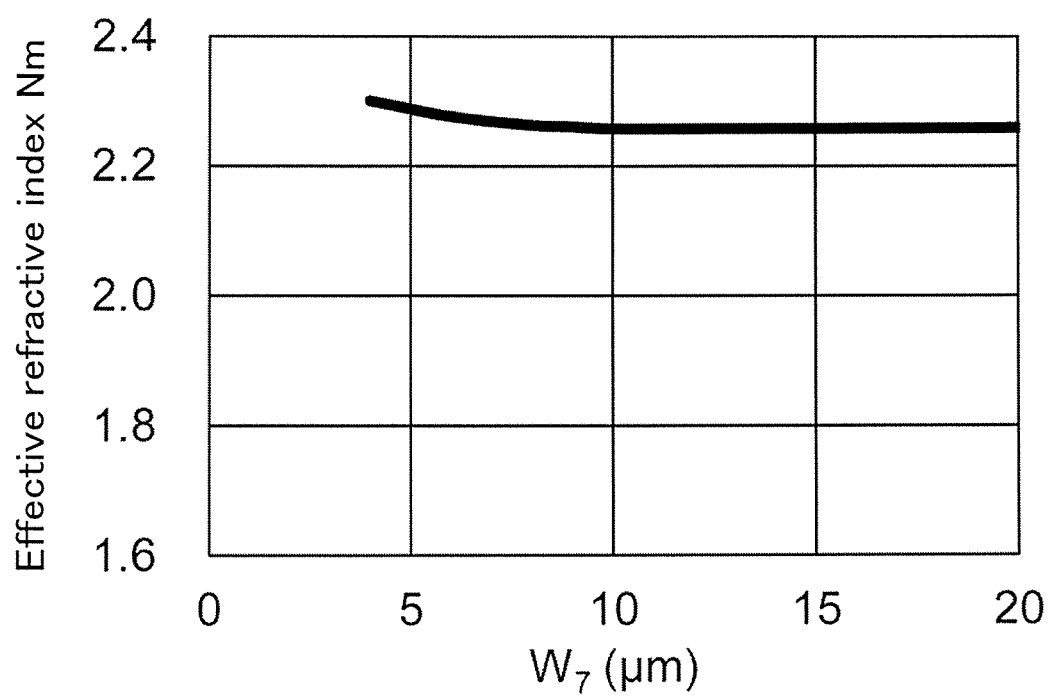
FIG. 18 is a graph illustrating the simulation result of the effective refractive index of microwave when the width $W_7$ ($=W_{7a}=W_{7b}$) of each of the upper layer parts $7a_H$ and $7b_H$ of the signal electrodes is changed.

FIG. 18 is a graph illustrating the simulation result of the effective refractive index of microwave when the width $W_7$ of each of the upper layer parts $7a_H$ and $7b_H$ of the signal electrodes was changed. In FIG. 18, the horizontal axis indicates the width $W_7$ (µm) of each of the upper layer parts $7a_H$ and $7b_H$ of the signal electrodes, and the vertical axis indicates an effective refractive index $N_m$ of microwave. As can be seen from FIG. 18, even when the width $W_7$ of each of the upper layer parts $7a_H$ and $7b_H$ is increased, the effective refractive index $N_m$ changes little and substantially equal to the refractive index (2.26) of light, thus satisfying the velocity matching condition.

Figure 19:
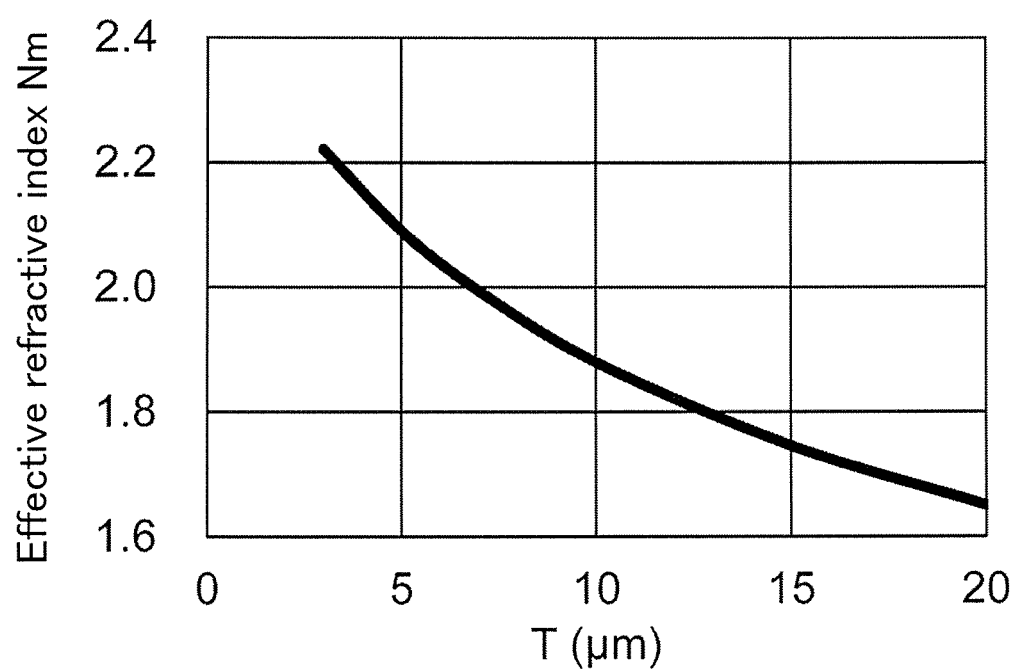
FIG. 19 is a graph illustrating the simulation result of the effective refractive index when the thickness T of each of the electrodes 7a, 7b, 7c and 7d is changed in the comparative example of FIG. 17.

On the other hand, FIG. 19 illustrates the simulation result of the effective refractive index $N_m$ of microwave when the thickness T of each of the electrodes $7a$, $7b$, $7c$ and $7d$ is changed in the comparative example of FIG. 17. As can be seen from FIG. 19, when the thickness T of each of the electrodes $7a$, $7b$, $7c$ and $7d$ is increased, the effective refractive index $N_m$ is abruptly reduced and differs significantly from the effective refractive index (2.26) of light, thus failing to satisfy the velocity matching condition.

To increase the width $W_7$ in the example and to increase the thickness T in the comparative example bring about the same effect in terms of a reduction in electrode loss. However, the effective refractive index of microwave little changes even when the width $W_7$ of the example is increased, satisfying the velocity matching condition, whereas it is significantly reduced when the thickness T in the comparative example is increased, failing to satisfy the velocity matching condition. Thus, it can be seen that the structure of the example is superior.

Thus, according to the signal electrode having a two-layer structure according to the present invention, both improvement (reduction in the VπL) in the electric field efficiency and reduction in electrode loss can be achieved, providing advantage for a wider bandwidth and low voltage operation in optical fiber communication.

The electric field efficiency of the optical modulator 1000 having a cross-sectional structure illustrated in FIG. 14 was evaluated by simulation. In this optical modulator, the substrate 1 was a sapphire single crystal substrate (specific dielectric constant: 10), the waveguide layer 2 was formed of a lithium niobate film, the protective layer 3 was formed of $SiO_2$ (specific dielectric constant: 4), the buffer layer 4 was formed of an oxide La-AL-O (specific dielectric constant: 13) composed of La, Al and the like, the dielectric layer 8 was formed of $TiO_2$ (specific dielectric constant: 60), the insulating layer 5 was formed of $SiO_2$ (specific dielectric constant: 4), and the electrode layer 7 was made of Au. The thickness of the waveguide layer 2 was 1.5 µm, the slab thickness of the waveguide layer 2 was 0.4 µm (the thickness of the ridge part 2r was 1.1 µm), the ridge width $W_0$ of the waveguide layer 2 was 1.2 µm, the thickness of the dielectric layer 8 was 0.15 µm, the gap between the first and second waveguides was 18 µm, the thickness H of the insulating layer 5 was 2 µm, the width $W_{7a}$ of the upper layer part of the signal electrode was 9 µm (=$W_{7b}$), the width $Wa_L$ of the lower layer part of the signal electrode was 3 µm (=$Wb_L$), the thickness T of the electrode layer 7 was 3 µm, the gap G1a between the signal electrode and the ground electrode was 24 µm (=G1b), and the electrode length (interaction length) of the signal electrode along the optical waveguide was 20 mm.

In the above configuration, when a signal frequency was 32 GHz, a half-wavelength voltage Vπ of 3.9 V and a bandwidth of 47 GHz were obtained and, thus, an optical modulator operating at 64 Gbaud can be obtained while supporting a wider bandwidth and achieving low voltage operation.

Figure 20:
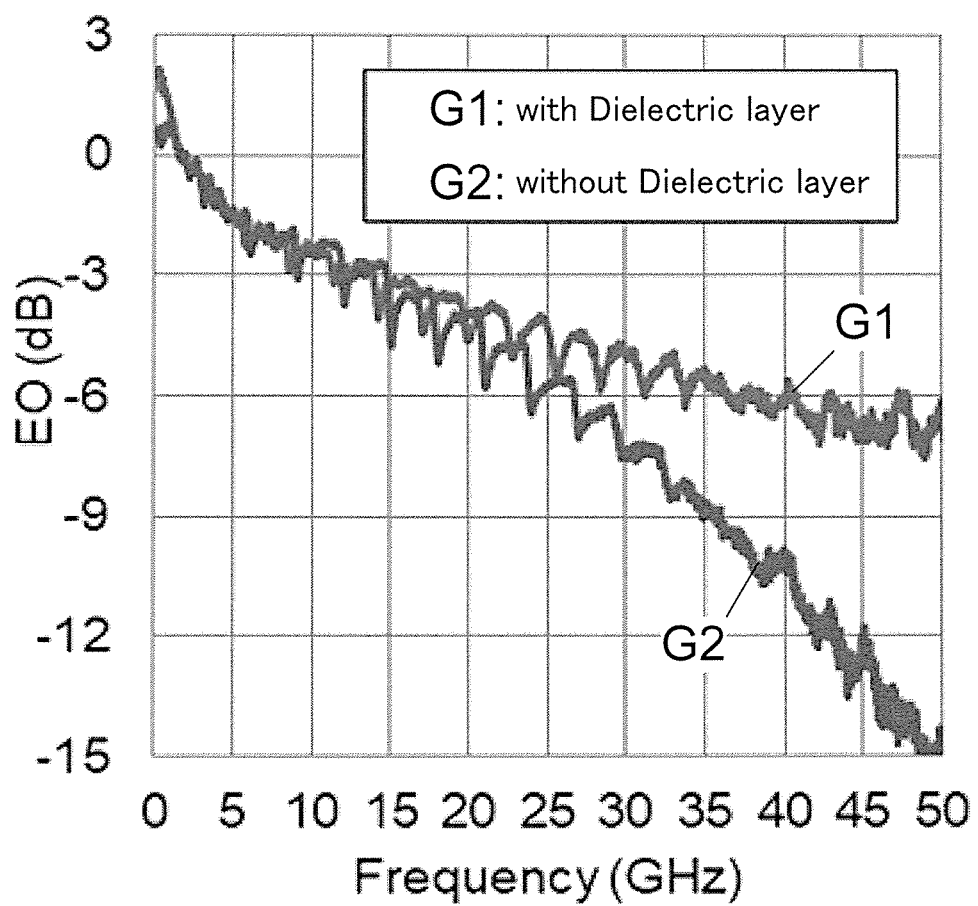
FIG. 20 is the result of the measurement of EO of the 4-channel optical modulator having the parameter of the presence/absence of the dielectric layer, and the graph showing the frequency characteristics of the signals output from the second-channel when the signals are input to the second channel.
Figure 21A:
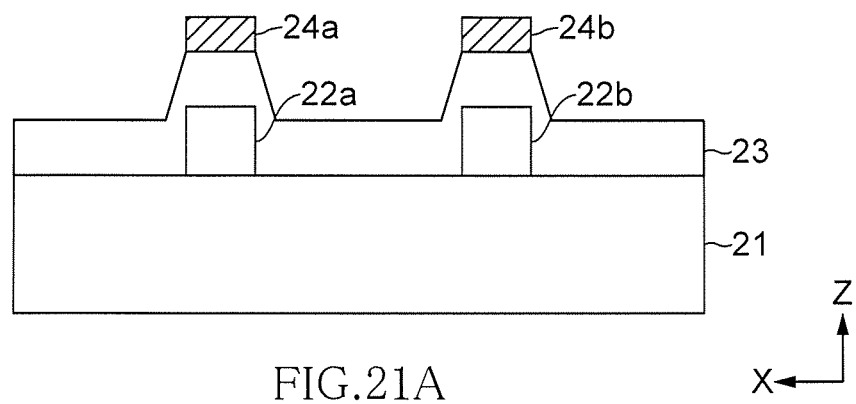
FIGS. 21A and 21B are schematic cross-sectional views each illustrating the structure of a conventional optical modulator.
Figure 21B:
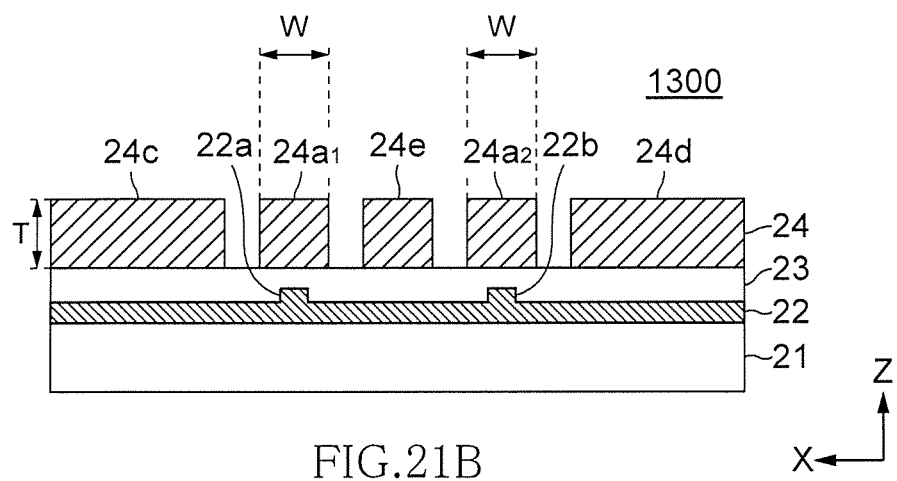

Next, the influence that the presence/absence of the dielectric layer 8 has on the EO characteristics of the optical modulator was examined. As an example, the dielectric layer was provided in an optical modulator having the configuration illustrated in FIG. 2, in which the dielectric layer 8 was formed of polyimide and had a thickness of 3 µm. On the other hand, as a comparative example, the same configuration as in the above example was used except that the dielectric layer 8 was not provided. The result is illustrated in FIG. 20. In the case of the optical modulator according to the example in which the dielectric layer 8 is provided, the EO characteristics of –6 dB or more is obtained up to the vicinity of 35 GHz, and a wider bandwidth of 35 GHz or more can be realized. On the other hand, in the case of the optical modulator according to the comparative example, the EO characteristics become –6 dB or less at 25 GHz or higher, and a wider bandwidth of 35 GHz or more cannot be realized.

What is claimed is:
1. An optical modulator comprising:
 a substrate;
 first and second optical waveguides each formed of a ridge-shaped electro-optic material film and disposed so as to be mutually adjacent on the substrate;
 a buffer layer covering upper surfaces of the first and second optical waveguides;
 an insulating layer formed above the buffer layer;
 an electrode layer formed on the insulating layer and including first and second signal electrodes provided above the buffer layer so as to be opposed respectively to the first and second optical waveguides; and
 a dielectric layer covering at least one of a part of an exposed surface of the first signal electrode and a part of an exposed surface of the second signal electrode, and a part of an upper surface of the buffer layer, wherein
 the first signal electrode includes a first lower layer part opposed to the first optical waveguide through the buffer layer and a first upper layer part provided above the first lower layer part,
 the second signal electrode includes a second lower layer part opposed to the second optical waveguide through the buffer layer and a second upper layer part provided above the second lower layer part,
 a width of a lower surface of each of the first and second lower layer parts is smaller than a width of each of the first and second upper layer parts,
 a width of the first upper layer part extends from the first lower layer part to a side opposite to the second signal electrode,
 a width of the second upper layer part extends from the second lower layer part to the side opposite to the first signal electrode,
 the first and second upper layer parts are formed in the electrode layer,
 the first and second lower layer parts are each embedded in openings formed in the insulating layer, and
 differential signals are applied to the first and second signal electrodes.

2. The optical modulator as claimed in claim 1, wherein a gap between the first and second upper layer parts is equal to or larger than a gap between the first and second lower layer parts.

3. The optical modulator as claimed in claim 1, wherein at least part of the insulating layer existing at the lower portion of an electrode isolation area between the first and second signal electrodes may be removed.

4. The optical modulator as claimed in claim 1, wherein the dielectric layer is formed on upper and side surfaces of each of the first and second signal electrodes and an upper surface of the insulating layer in an area not overlapping the first and second signal electrodes in a plan view.

5. The optical modulator as claimed in claim 1, wherein the dielectric layer is formed on the upper surface of the buffer layer, and
the insulating layer is formed on an upper surface of the dielectric layer.

6. The optical modulator as claimed in claim 1, wherein no ground electrode is provided in an area in the vicinity of the first signal electrode on a side opposite to the second signal electrode with respect to the first signal electrode and in an area in the vicinity of the second signal electrode on a side opposite to the first signal electrode with respect to the second signal electrode.

7. An optical modulator comprising:
a substrate;
first and second optical waveguides each formed of a ridge-shaped electro-optic material film and disposed so as to be mutually adjacent on the substrate;
a buffer layer covering upper surfaces of the first and second optical waveguides;
first and second signal electrodes provided above the buffer layer so as to be opposed respectively to the first and second optical waveguides; and
a dielectric layer covering at least one of a part of an exposed surface of the first signal electrode and a part of an exposed surface of the second signal electrode, and a part of an upper surface of the buffer layer, wherein
a first ground electrode disposed in an area in the vicinity of the first signal electrode on a side opposite to the second signal electrode with respect to the first signal electrode; and
a second ground electrode disposed in an area in the vicinity of the second signal electrode on a side opposite to the first signal electrode with respect to the second signal electrode.

8. An optical modulator comprising:
a substrate;
first and second optical waveguides each formed of a ridge-shaped electro-optic material film and disposed so as to be mutually adjacent on the substrate;
a buffer layer covering upper surfaces of the first and second optical waveguides;
first and second signal electrodes provided above the buffer layer so as to be opposed respectively to the first and second optical waveguides; and
a dielectric layer covering at least one of a part of an exposed surface of the first signal electrode and a part of an exposed surface of the second signal electrode, and a part of an upper surface of the buffer layer, wherein
each of the first and second optical waveguides has at least one linear section and at least one curved section,
the first signal electrode is provided along the linear section and the curved section of the first optical waveguide, and
the second signal electrode is provided along the linear section and the curved section of the second optical waveguide.

9. An optical modulator comprising:
a substrate;
first and second optical waveguides each formed of a ridge-shaped lithium niobate film and disposed so as to be mutually adjacent on the substrate;
a buffer layer covering upper surfaces of the first and second optical waveguides;
first and second signal electrodes provided above the buffer layer so as to be opposed respectively to the first and second optical waveguides; and
a dielectric layer covering at least one of a part of an exposed surface of the first signal electrode and a part of an exposed surface of the second signal electrode, and a part of an upper surface of the buffer layer, wherein
a c-axis of the lithium niobate film is oriented perpendicular to a main surface of the substrate.

* * * * *